(12) United States Patent
Yokoyama et al.

(10) Patent No.: US 8,923,656 B1
(45) Date of Patent: Dec. 30, 2014

(54) CORRECTION OF ACQUIRED IMAGES FOR CUTTING PATTERN CREATION

(71) Applicant: Silhouette America, Inc., Orem, UT (US)

(72) Inventors: Mitsuru Yokoyama, Irvine, CA (US); Thomas Richard Sanham, Devon (GB)

(73) Assignee: Silhouette America, Inc., Orem, UT (US)

( * ) Notice: Subject to any disclaimer, the term of this patent is extended or adjusted under 35 U.S.C. 154(b) by 0 days.

(21) Appl. No.: 14/274,593

(22) Filed: May 9, 2014

(51) Int. Cl.
*G06K 9/03* (2006.01)
*G06T 5/00* (2006.01)

(52) U.S. Cl.
CPC ..................................... *G06T 5/006* (2013.01)
USPC ....................................................... 382/309

(58) Field of Classification Search
CPC .......... H04N 1/00358; H04N 1/00376; H04N 1/00567; H04N 13/0275; H04N 2213/003; H04N 2213/005; G06K 9/222; G06K 9/6204; G06K 2209/19; G06T 3/005; G06T 17/00; A41H 3/007; B26D 5/00; B26D 5/005; B26D 5/02; B26D 7/015; B26F 1/38; B26F 1/3806; B26F 1/3813; G03F 1/144; G03F 1/36; G03F 7/70433; G06Q 10/043
See application file for complete search history.

(56) References Cited

U.S. PATENT DOCUMENTS

| | | | |
|---|---|---|---|
| 3,895,358 A * | 7/1975 | Pearl | 700/1 |
| 4,807,143 A * | 2/1989 | Matsuura | 700/131 |
| 5,497,236 A | 3/1996 | Wolff et al. | |
| 5,727,433 A * | 3/1998 | Pomerleau et al. | 83/29 |
| 6,492,073 B1 * | 12/2002 | Lin et al. | 430/5 |
| 7,054,708 B1 * | 5/2006 | Aamodt et al. | 700/122 |
| 8,103,376 B2 * | 1/2012 | Wang et al. | 700/195 |
| 8,133,763 B2 * | 3/2012 | Koduri | 438/123 |
| 8,367,969 B2 * | 2/2013 | Caristan | 219/121.67 |
| 8,542,921 B1 | 9/2013 | Medina | |
| 2006/0210192 A1 | 9/2006 | Orhun | |
| 2007/0012146 A1 | 1/2007 | Workman et al. | |
| 2010/0217428 A1 | 8/2010 | Strong et al. | |
| 2013/0003081 A1 | 1/2013 | Smits | |

FOREIGN PATENT DOCUMENTS

| | | |
|---|---|---|
| WO | 2009137073 | 11/2009 |
| WO | 2013155379 | 10/2013 |

* cited by examiner

*Primary Examiner* — Jose Couso
(74) *Attorney, Agent, or Firm* — Stetina Brunda Garred & Brucker

(57) ABSTRACT

The production of a cutting pattern of a graphic placed upon a cutting mat is disclosed. A source image of the graphic overlaid on a cutting mat is received, and includes a plurality of registration marks as well as one or more distortions introduced during acquisition. The registration marks are identified from the source image by matching candidate sets of a plurality of center points of regions of adjacent groupings of pixels within the source image against predetermined positional relationships thereof corresponding to an actual arrangement of the registration marks on the cutting mat. An inverse transformation of the source image with values derived from the registration marks is applied. A corrected image aligned to physical coordinates of the cutting mat and referenced to the cutting machine is generated. A cut path is defined from vectors of the corrected image, and transmitted to the cutting machine for execution thereon.

30 Claims, 14 Drawing Sheets

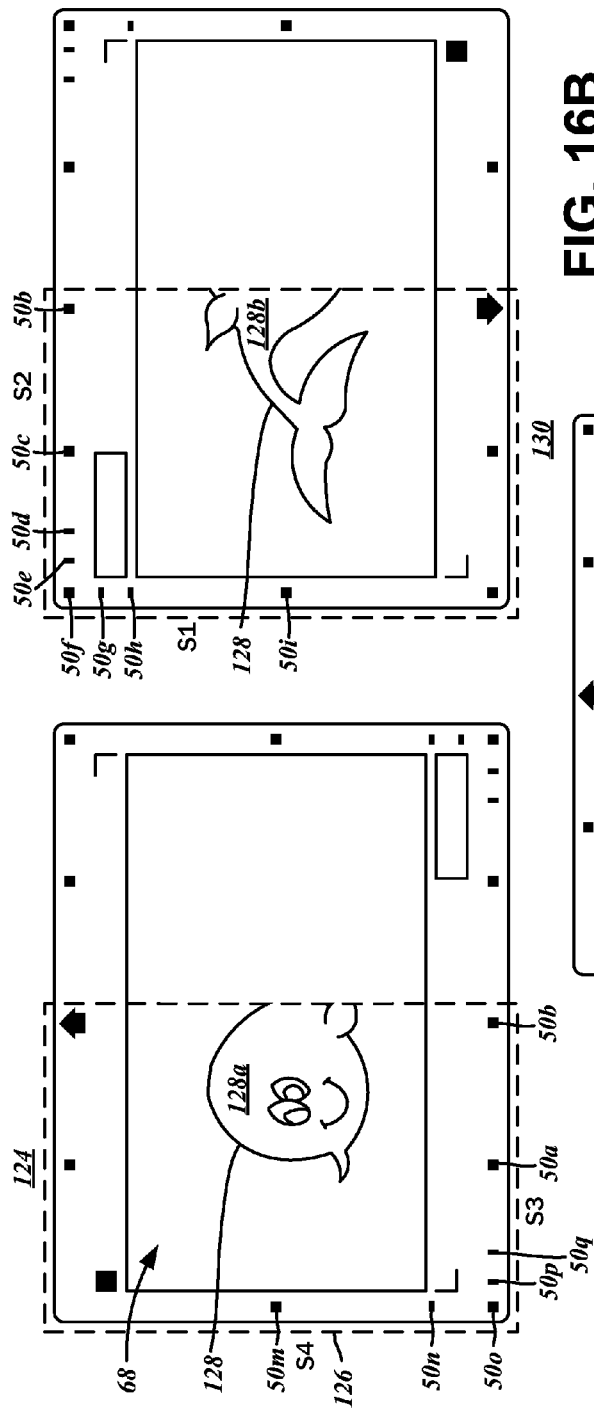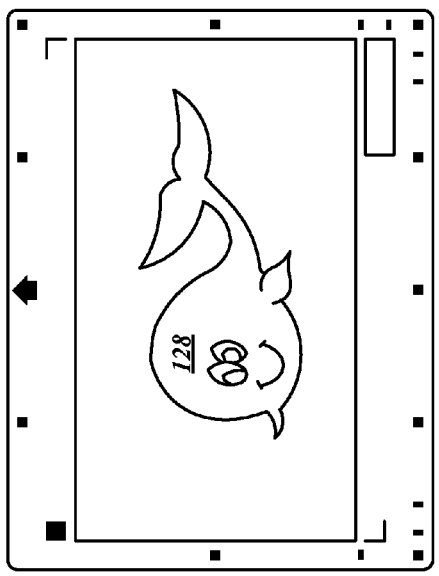
FIG. 16A
FIG. 16B
FIG. 17

CORRECTION OF ACQUIRED IMAGES FOR CUTTING PATTERN CREATION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to digital imaging as well as material cutting machines for handicrafts, and more particularly, to the correction of acquired images from which designs for cutting patterns are created.

2. Related Art

Handicraft encompasses the design and creation of a wide variety of decorative and utilitarian articles utilizing a range of different media, including paper, textiles, leather, wood, metal, glass, stone clay, and so forth. With the widespread availability of detailed project instructions and information on useful techniques in print and especially online, and fueled by the popularity of the individualist, do-it-yourself ethos, interest in and pursuit of the crafts has been increasing. In many instances, the article sought may simply not be available on the market, too costly to purchase, or too low of a quality. Alternatively, the personal satisfaction and empowerment experienced as result of engaging in the creative process may be the primary motivation. Regardless of the reasons, hobbyists are finding value and enjoyment in handicrafts. Some of the more skilled have found a receptive market for the articles, and with the aid of specialty handicraft oriented e-commerce services, have turned what was otherwise a leisure time activity into secondary sources of income, and even full-time occupations.

Although many projects require specialized tools as well as extensive training and education over a long period of time, some of the more accessible are those that involve working with sheet materials and creating designs therefrom. Indeed, cutting paper, textiles, and other like materials into different patterns is oftentimes part of primary school and adolescent education. More sophisticated forms of handicraft with sheet material (in whatever form) find application in scrapbooking, card making, home decorating, and so forth. For example, different shapes, titles, and paper embellishments can be added to scrapbook pages, as well as greeting cards. Various graphical designs may be first printed onto the paper sheets, and then cut for application on to another article or surface. Along these lines, labels and other designs cut from vinyl sheets can be affixed to wall surfaces and articles in the home to enhance their appearance. Such vinyl labels can also be attached to glass surfaces with the exposed portions being etched in the reverse of the label design. However, because manually cutting complex designs with scissors, hobby knives, and other hand tools can be a difficult and cumbersome process, particularly where the same design is being reproduced and/or when the precision is required, several automation devices have been developed for the handicraft market.

One such device is the cutting machine, which is generally comprised of a cutting tool that is positioned and driven by an electronically controlled motor, with the specific signals to the motor for the positioning and cutting operations being provided by an on-board controller. Cutting patterns are defined by a set of positioning and cutting instructions with parameter values therefor to the controller, whereupon execution, the tool is operated in accordance with those instructions. The sheet material, in whatever form, is affixed to a cutting mat that has peripheral registration marks that help align the work piece. Along these lines, the cutting patterns also include work piece feeding parameters, as the tool heads are typically operable along a single axis. With a basic cutting machine, all of the aforementioned sheet material projects could be made with ease, and minimizing the importance of manual dexterity in achieving excellent results. Generally, if a handicraft project calls for any cutting of sheet material, a cutting machine can perform the task with greater precision and speed.

Because earlier products targeted a user base that may not necessarily have had experience with personal computers, such cutting machines were designed as standalone devices with minimal operating complexity. Thus, only a limited number of predefined cutting patterns stored on an on-board memory module were available for selection. Some devices employed interchangeable memory cartridges that expanded the options of cutting patterns available. The user interface for making the desired selections tended to be minimalistic, as they were integrated with the cutting machine.

As the prevalence of personal computers and the comfort level of the target user base with its operation have increased, the control and pattern selection functions. i.e., the user interface functions, for cutting machines gradually shifted thereto. With most computer users being familiar with the setup and operation of printers, the similarities of cutting machines in that regard eased the adoption of these improved devices. Like a conventional printer, the on-board controller of the cutting machine communicates bi-directionally with the personal computer via Universal Serial Bus (USB) or other like short range wired or wireless data communications modality. The computer, in turn, includes driver software for interfacing directly with the controller, as well as application software through which the user can select cutting patterns. Again, these patterns represent instructions to the controller to move and operate the tool in accordance with specific parameters, also referred to as cut paths, and are defined in terms of vectors extending between a starting point and an ending point along coordinate axes.

Some cutting machine and operating software combinations have retained the aforementioned conceptual model of grouping a limited number of pre-made patterns into a single "cartridge" or module for the sake of continuity and maintaining ease of use. Rather than switching physical modules connectible to the cutting machines, collections of patterns could be downloaded online and installed on the personal computer. In addition to the downloadable patterns, the software could include default sets that were provided at the time of installation. Via the graphical user interface, selections of desired cutting patterns from the catalogue of available ones could be made and executed on the cutting machine.

Although pre-designed patterns fulfilled many needs, advanced users desired true customization in which the cutting patterns could be individually designed. Oftentimes it is desirable to start with an existing image or design graphic such as drawings, paintings, photographs, and other artwork, and create a pattern therefrom. In many cases, the artwork was created manually and does not exist in a digital form that can be manipulated with the personal computer, and there would be no cutting patterns either. However, even where there is a digital version of that artwork, the cutting patterns therefor usually do not exist. As indicated above, cut paths are defined in terms vectors between a starting point and an ending point, and so it would be necessary for users to draw each these cut path vectors via the graphical user interface. The process of defining the cut paths can be automated to some extent, but accurate reproduction of the artwork and creation of the cutting pattern depends on a quality underlying image.

This concern is particularly acute with acquired images. Cameras on mobile devices, as well as digital cameras in general are widely available and utilized for a variety of image capturing tasks. Additionally, high resolution desktop scanners are becoming more accessible to hobbyists from both the technology and cost standpoint. However, despite significant technical improvements, the problem of image quality remains.

With respect to camera capture, it is impractical for the user to take photographs of the artwork that is exactly a front/orthogonal view, as some distortion in perspective and rotation is almost inevitable. Once an image including such distortions is captured, it is possible to correct the same by identifying corner markings that serve as a reference, and altering the remainder of the image to reverse the error. Earlier techniques for identifying the corner markings involved the manual input/designation thereof, but this added step may be bothersome to the user, and is another opportunity to introduce human error. Accordingly, a more automated process is needed.

As a matter of principle, as few as four corner marks should be sufficient to deduce the necessary transformations to eliminate the perspective error. However, interference from other visual components that may have been inadvertently captured along with the desired artwork, such as nearby desktop clutter, produces unreliable and unsatisfactory results. Poor lighting conditions, extreme shadows, and noise further compounds the difficulty of correctly identifying error correction reference points.

Proper acquisition of artwork via a scanner also has associated challenges, though not necessarily the same ones as with a camera. The article can be placed consistently and accurately perpendicular to the optical plane of the scanner imaging element, thereby minimizing perspective errors. The scanner bed may be smaller in size than the artwork, so it may be necessary to scan different parts of the image in separate scanning passes, and then stitch those separate images together automatically with the correct alignment. Furthermore, the user cannot be expected to manually place the artwork into the scanner in exact alignment with the coordinate systems of the cutting machine and the software application.

Accordingly, there is a need in the art for the correction of acquired images from which designs for cutting patterns are created to eliminate perspective and rotation errors. There is also a need in the art for properly identifying features within the acquired images that are indicative of perspective, rotation, and positioning errors despite the existence of extraneous objects and noise, whether acquired via camera or via scanner.

BRIEF SUMMARY

The various embodiments of the present disclosure contemplate the correction of acquired images such as drawings, paintings, photographs, and other artwork, from which an accurate cut path around the edges can be defined to create patterns in sheet form for handicrafts and other uses. In accordance therewith, registration marks within the acquired images are correctly identified for eliminating or compensating for perspective, rotation, and positioning errors so that vector cut paths are accurately defined. Furthermore, these corrections are to be useful for combining multi-part images as a single image of the original artwork. This is envisioned to be possible even when the artwork is dirty and/or replete with noise, or is acquired within a cluttered environment.

One embodiment of the present disclosure is a method for producing a cutting pattern on a cutting mat with a graphic placed thereon. The cutting mat can be fed into a cutting machine, and the cutting pattern may be based upon a cut path that corresponds to an outline of the graphic. The method may include receiving a source image of the graphic overlaid on the cutting mat from an imaging device as a bitmap. The source image may include a plurality of registration marks and one or more distortions introduced by the imaging device during acquisition. There may also be a step of identifying the plurality of registration marks from the source image. This identification can be made from matching candidate sets of a plurality of center points of regions of adjacent groupings of pixels within the source image against predetermined positional relationships thereof corresponding to an actual arrangement of the registration marks on the cutting mat. There may be a step of deriving values for an inverse transformation of the source image. These values may be derived from the identified plurality of registration marks on the cutting mat. Thereafter, the method may include applying the inverse transformation to the source image with the derived values. This step may generate a corrected image as a bitmap that is aligned to physical coordinates of the cutting mat that is referenced to the cutting machine. There may additionally be a step of deriving the cut path from generated vectors of the corrected image. The cut path may be defined with reference to the physical coordinates utilized by the cutting machine. There may also be a step of transmitting the cut path to the cutting machine for execution thereon.

In accordance with another embodiment, the present disclosure contemplates a method for correcting a source image of a graphic overlaid on a cutting mat. The cutting mat may include a plurality of registration marks. The source image may be corrected for the purpose of generating a cut path corresponding to an outline of the graphic, and from which a sheet cutting pattern is produced. The method may begin with a step of receiving a source image from an imaging device as a bitmap. The source image may include one or more distortions introduced by the imaging device during acquisition. The method may also include converting the source image to a high contrast monochrome image. This image may have a plurality of objects defined by regions of adjacent groupings of pixels on a background field. There may also be a step of identifying a center of each of the objects in the high contrast monochrome image as a candidate registration mark point. The method may also include generating a list of sets of pairs of the candidate registration mark points that have a predefined number of additional candidate registration mark points interposed between a straight line spanning the candidate registration mark points of a particular one of the pair sets. Furthermore, there may be a step of identifying a chained grouping of candidate registration mark points from sets of the pairs in the list that share one common candidate registration mark point. The method may include storing each of the candidate registration mark points of the identified chained grouping as designated registration mark points. These designated registration mark points are understood to correspond to corner regions of the cutting mat as represented in the source image. There may also be a step of transforming the source image to a corrected image that is defined according to physical coordinates. The transformation may be based upon the designated registration mark points.

Certain other embodiments of the present disclosure contemplate respective computer-readable program storage media that each tangibly embodies one or more programs of instructions executable by a data processing device to perform the foregoing methods. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 16A-16B shows different parts of a source image being scanned in separate passes to accommodate smaller scanner platens; and FIG. 17 is a combined representation of the two scanning passes shown in FIGS. 16A and 16B.

DETAILED DESCRIPTION

The present disclosure contemplates the correction of images used to create patterns with electronic cutting machines cutting around the edge of drawings, paintings, photographs, and any other graphics for which a digital version is not available. Errors introduced during the image acquisition process such as perspective errors, rotation errors, and translation errors are eliminated, so that correct cut paths for the cutting machines can be generated. The detailed description set forth below in connection with the appended drawings is intended as a description of the several presently contemplated embodiments of methods for correcting images and producing cutting patterns, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
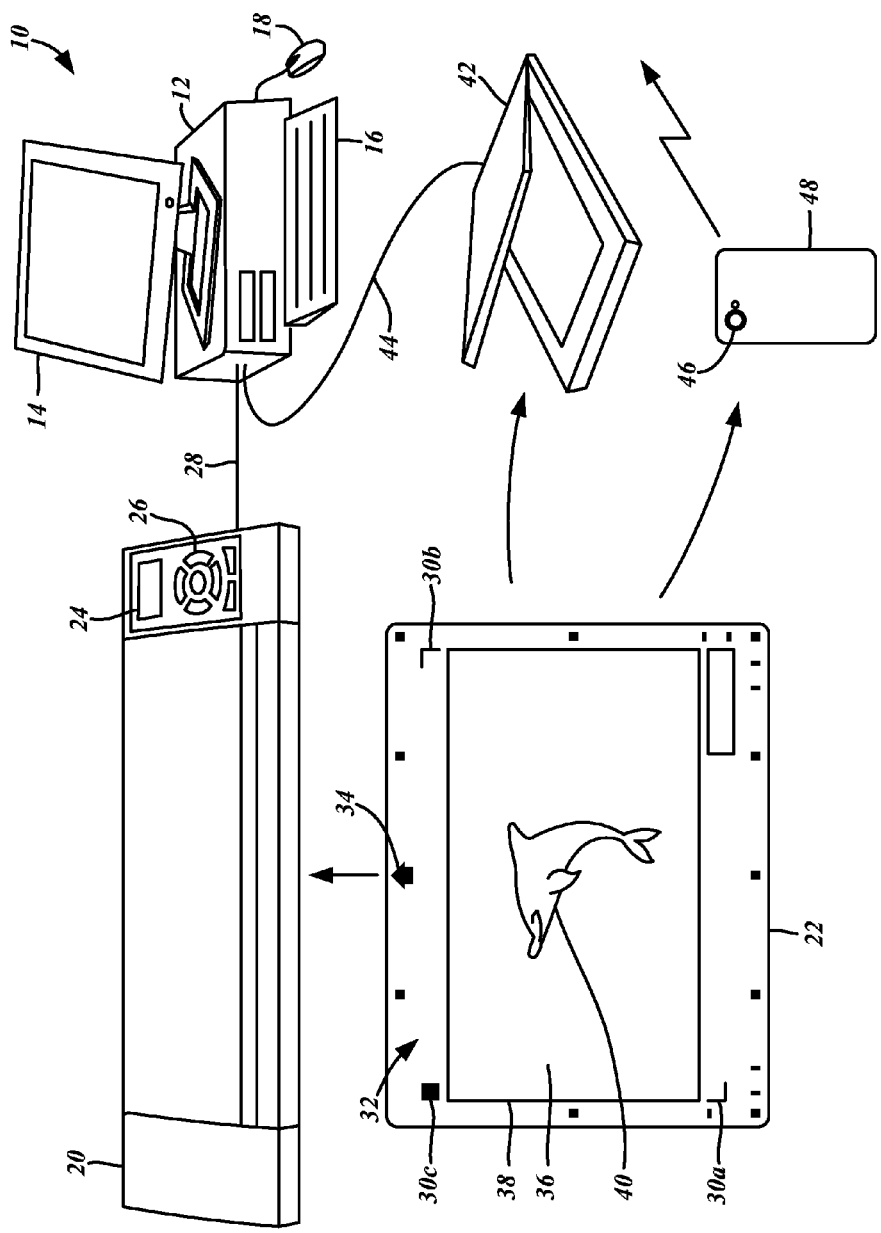
FIG. 1 is a block diagram illustrating an exemplary cutting machine usage environment including a personal computer system, one or more imaging devices, and a cutting mat with an example graphic affixed thereto.

The block diagram of FIG. 1 illustrates an example environment in which various embodiments of the present disclosure may be implemented. There is a general-purpose desktop computer system 10 comprised of a system unit 12 that includes, among other components, a processor, memory, and input/output interfaces and subsystems via which peripheral devices such as a display 14, a keyboard 16, and a mouse 18 are connected. There are numerous possible variations with regard to the hardware devices that comprise the computer system 10, and further, alternatives to the desktop computer form factor such as mobile computers, tablets, smartphones, and others may be readily substituted. Those having ordinary skill in the art will recognize the wide range of possible computing devices on which the embodiments of the present disclosure may be implemented.

Generally, the computer system 10 has software instructions loaded thereon that, when executed, perform a variety of functions as directed by inputs provided thereto, and outputs the results of such performed act. One software component is an operating system that manages and coordinates the operation of the various hardware components of the computer system 10. Furthermore, the operating system may provide a graphical user interface (GUI) that allows a user to interact with the computer system 10, that is, accept inputs entered on the keyboard 16 and the mouse 18, for example, and present the feedback therefrom on the display 14. Common operating systems include Microsoft Windows, Apple MacOS, though any others may be utilized.

As pertinent to the various embodiments of the present disclosure, the computer system 10 can interface with and control a cutting machine 20, which guides a cutting tool through a work sheet along a designated cut path to produce various patterns. It is understood that a wide variety of materials can be utilized for the work sheet, including paper, vinyl, heat transfer material, fabric, and so forth. The work sheet is placed on to an adhesive cutting mat 22 that is fed through the cutting machine 20.

A limited user interface comprised of a display 24 and several menu option navigation keys 26 is integrated into the cutting machine 20, though a richer experience is possible when interacting with a dedicated software application running on the computer system 10. Visual representations of the existing cut paths, that is, the designs of the cutting pattern, can be shown and selected via the software application on the computer system 10. Furthermore, patterns can be custom designed with the software application. Once a pattern is selected, the corresponding instructions that guide the cutting tool are communicated to the cutting machine via a data transfer link 28. Although any conventional peripheral device link modality can be utilized, according to one embodiment, the data transfer link 28 is a Universal Serial Bus (USB) connection.

As indicated above, an on-board controller then generates signals to an electric motor to position the cutting tool as specified in the cut path data. Conventionally, the cut path may be defined relative to a two-dimensional coordinate system that may or may not be specified in terms of a standard unit of measure. However, because the cutting tool moves about a physical area of the cutting mat 22, the positioning data specified in the cut path is likewise relative to a physical location. Thus, such location data may also be referred to as physical coordinates of the cutting mat 22.

Initial alignment of the cutting mat 22 with the cutting tool may be achieved with a set of cutting machine registration marks 30a, 30b, 30c that are disposed along an outer periphery or margin 32 of the cutting mat that can be read by sensors in the cutting machine 20. The registration marks 30 can be utilized to compensate for any errors in the placement/insertion of the cutting mat 22 with respect to the cutting machine 20. That is, the registration marks 30 are used to align the coordinate system of the cutting machine 20 so that transformations of the vector cut path data to align with the actual physical position on the cutting mat 22 are possible. In one embodiment, the first and second cutting machine registration marks 30a, 30b are perpendicular line segments positioned diagonally opposed to each other, and may have a dimension of 12 mm in each direction. Furthermore, the third cutting machine registration mark 30c may have a square configuration with dimensions of 6 mm by 6 mm, and positioned in a different corner from that with the first and second cutting machine registration marks 30a, 30b. The cutting machine registration marks 30 may have varying dimensions, and the foregoing particulars have been presented by way of example only and not for limitation. In order to indicate the proper direction in which the cutting mat 22 is to be fed into the cutting machine 20, at a center of the margin 32, there may be a feed direction arrow 34. Other applications are contemplated for the registration marks and the feed direction arrow 34, which will be described in further detail below.

Within the margin 32 is a rectangular cutting field 36 that represents the area within which the cutting tool can be positioned. The cutting field 36 can be sized and configured to accommodate a standard letter size sheet (215.9 mm by 279.4 mm) or an A4 size sheet (210 mm by 297 mm), depending on the paper size customs of the market locale, though is by way of example only and not of limitation. So that either standard paper size can be accommodated, the cutting field 36 may be sized with the maximum dimensions for each axis, e.g., 216 mm by 297 mm. The cutting field 36 is visually designated by a corresponding border 38.

The dimensional particulars of the cutting mat 22 and the sub-features thereof are predetermined and known to the controller of the cutting machine 20 as well as the computer system 10 for the sake of consistency and compatibility. In other words, it will be appreciated by those having ordinary skill in the art that the cutting mat 22 is configured specifically for the cutting machine 20; any change in dimensional boundaries with respect to the cutting machine 20 will involve corresponding changes to the cutting mat 22.

Because the cutting mat 22 will be subject to forces from the feed roller on the cutting machine, abrasion associated with the movement of the cutting tool against the sheet material, and so forth, it is understood to be constructed of a durable, scratch-resistant, and washable material that is sufficiently rigid to resist curling at the edges and corners. As will be described in further detail below, various embodiments contemplate the usage of the cutting mat 22 as a background for image acquisition, so the material may have an opaque, matte white color.

In addition to selecting pre-designed cutting patterns or custom designing cutting patterns in the computer system 10 for producing the same on the cutting machine 20, the present disclosure contemplates a method for producing a cutting pattern for artwork and designs for which a vector cut path has not been defined. Thus, patterns can be cut around images from existing material such as magazines, cards, and other media, that is, the cut path can correspond to an outline of the selected image. As shown in FIG. 1, such graphics 40 can be affixed to the adhesive surface of the cutting mat 22. These methods can be implemented as a series of instructions that are executed by the computer system 10 that are stored on a non-transitory data storage medium readable by the same.

Figure 2:
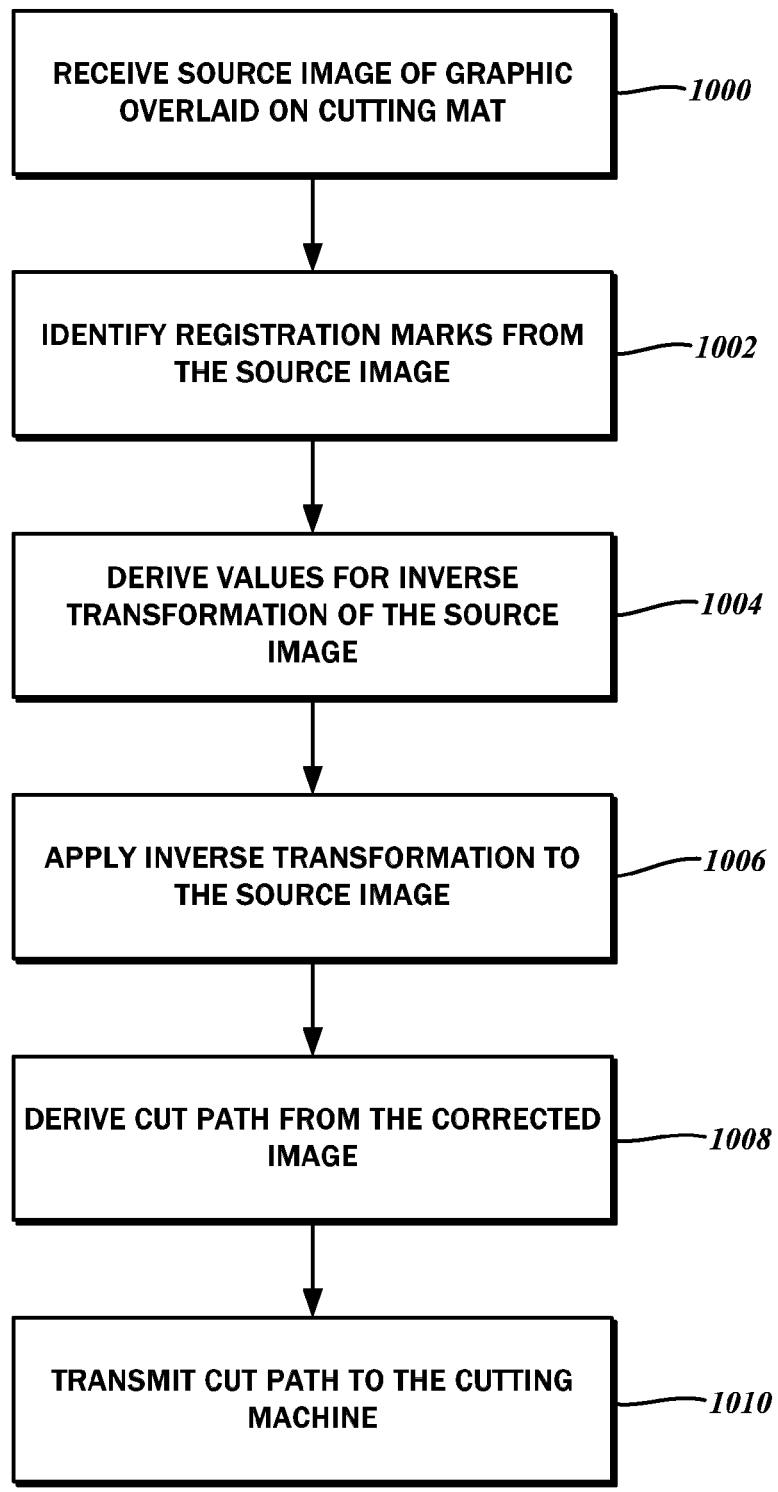
FIG. 2 is a flowchart depicting one embodiment of a method for producing a cutting pattern on a cutting mat with a graphic placed thereon.

With reference to the flowchart of FIG. 2, the method may begin with a step 1000 of receiving, from an imaging device, a source image of the graphic 40 overlaid on the cutting mat 22. The source image is understood to be the image as captured by the imaging device, and includes the aforementioned registration marks 30. As will be discussed in further detail below, the imaging device can introduce one or more distortions during acquisition, and various embodiments of the present disclosure are directed to correcting those distortions and creating a flat orthographic image of the cutting field 36 regardless of such errors so that an accurate cut path for the cutting machine 20 can be generated.

In one embodiment of the present disclosure, the imaging device is a scanner 42 that is connected to the computer system 10 via another data transfer link 44. Like the data transfer link 28 that connects the cutting machine 20 to the computer system 10, the data transfer link 44 may likewise be a USB connection. As will be recognized by those having ordinary skill in the art, the scanner 42 includes a moving sensor element that quantifies reflected light intensity values against a physical surface of a document, and converts the same to a digital image or bitmap comprised of pixels arranged in rows and columns. Scanning the adhesive surface of the cutting mat 22 may leave a residue on the glass platen of the scanner 42, so the cutting mat may incorporate spacer elements or shims to create a slight spatial offset.

When scanning an image, the distortions that are introduced typically involve rotation and/or translation (position) error. Thus, the corrective steps contemplated in accordance with the methods of the present disclosure involve inverse transformations on the scanned image that reverse rotation and translation effects. As will be described in further detail below, one implementation of the inverse transformation for such scanned images is a matrix operation.

In another embodiment of the present disclosure, the imaging device is a digital camera 46. Although the camera 46 is shown as integrated with a mobile communications device 48 in FIG. 1, it may also be a standalone digital camera, a webcam, a video camera, or the like that has a movable focusing element and a sensor device that converts received light intensity values to a digital image or a bitmap of pixels arranged in rows and columns. Where the camera is integrated with the mobile communications device 48, upon capture, the image may be transmitted to the computer system 10 wirelessly or by any other suitable data link modality. Conventional standalone digital cameras typically utilize a USB connection, or the image data may be transferred by reading the memory card with a suitable card reader connected to the computer system 10.

The camera 46 can capture images from different angles and perspectives, so the distortions that are introduced typically involve perspective and rotation errors. The corrective steps contemplated in the methods involve reversing such perspective and rotation errors, also referred to as "unperspectivize" transformations, the details of which will be described more fully below.

Because which of the particular one of the inverse transformations that is to be applied to distorted images depends on the source of the distortion, the software application from which such corrective functions are initiated operates in different modes that are largely independent of each other once invoked: a photograph mode and a scanner mode. The present disclosure also contemplates detecting which of these modes should be used based upon an analysis of the acquired image, and applying the appropriate correction. Further, as indicated above, in some configurations the cutting field 36 of the cutting mat 22 may be larger than the available platen area of the scanner 42, which is typically understood to be 216 mm by 297 mm. Thus, it may be necessary to scan the source image in multiple parts, and so the present disclosure also envisions the detection of which partial image corresponds to which actual side of the cutting mat 22, again based upon the analysis of the acquired images.

Figure 3A:
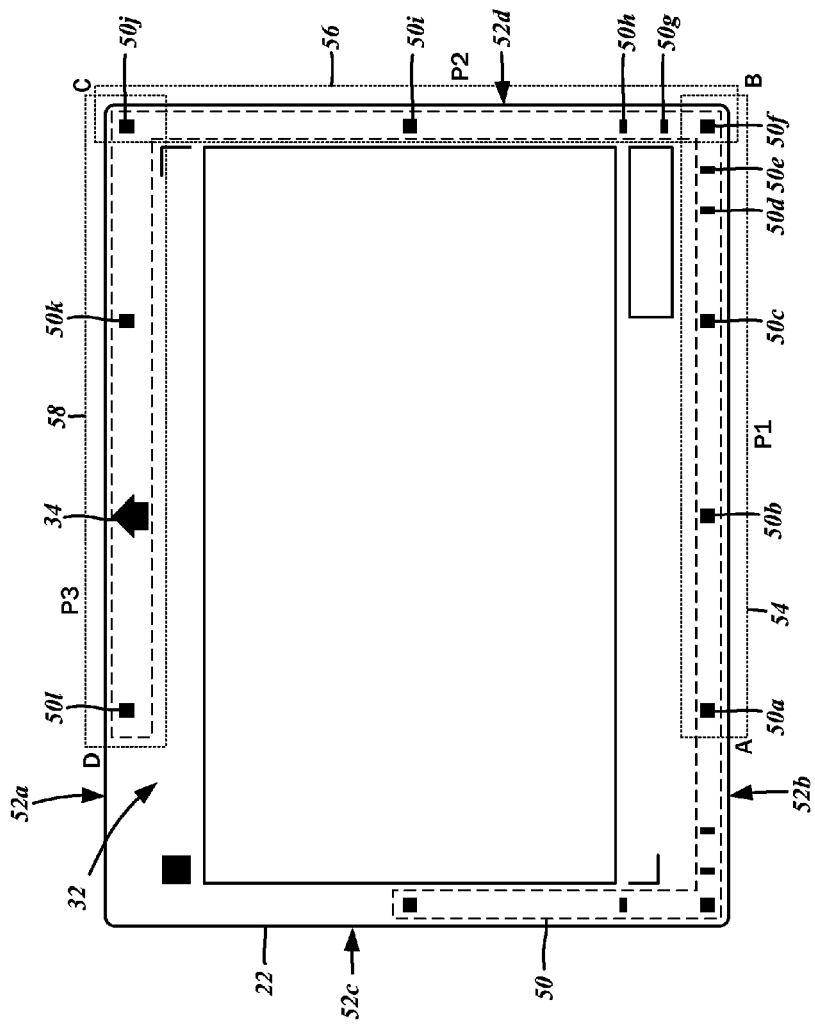
FIGS. 3A and 3B are a detailed plan views of the cutting mat in accordance with one embodiment of the present disclosure identifying photograph mode registration mark groups and scan mode registration mark groups, respectively.

As indicated above, the cutting mat 22 includes several registration marks 30 that are used for alignment with the cutting machine 20. Referring to FIG. 3A, there are additional registration marks 50 included within the margin 32 that are used as landmarks to assist in the selection and application of the appropriate inverse transformation to correct distortions in the source image. Each of the registration marks 50 are part of one or more groups of marks that together indicate a specific segment of the cutting mat 22, and so they will be individually identified. Again, the cutting mat 22 has a generally quadrilateral configuration with four sides 52, including a top side 52*a*, an opposed bottom side 52*b*, a left side 52*c*, and an opposed right side 52*d*.

Within the margin 32 and disposed along the bottom side 52*b*, there is a first registration mark 50*a*, a second registration mark 50*b*, a third registration mark 50*c*, a fourth registration mark 50*d*, a fifth registration mark 50*e*, and a sixth registration mark 50*f*, which together define a first registration mark group 54. The first registration mark 50*a*, the second registration mark 50*b*, the third registration mark 50*c*, and the sixth registration mark 50*f* are understood to have a square configuration with dimensions of 3 mm on each side, whereas the fourth registration mark 50*d* and the fifth registration mark 50*e* have a rectangular configuration with dimensions of 3 mm by 1.5 mm.

These dimensions are presented by way of example only, and any other suitable dimensions that are sufficient for capturing and scanning with clarity and distinction regardless of angle may be substituted. Further, the preferred, though optional embodiments of the present disclosure are contemplated to use registration marks 50 of the size and shape described hereinabove, as such a configuration has been found to be recognizable and distinctive following the various processing steps. Along these lines, for further enhancement in the recognition of the registration marks 50, they may be separated from the physical border of the cutting mat 22 by a predefined distance. This buffer of surrounding white space may also be 3 mm in accordance with one embodiment of the present disclosure. As utilized herein, no particular order is implied by the use of ordinal modifiers such as first, second, and so forth when referring to a particular one of the registration marks 50.

Also within the margin 32, and disposed along the right side 52*d* is the sixth registration mark 50*f*, a seventh registration mark 50*g*, an eight registration mark 50*h*, a ninth registration mark 50*i*, and a tenth registration mark 50*j* that together define a second registration mark group 56. As illustrated, the sixth registration mark 50*f*, the ninth registration mark 50*i*, and the tenth registration mark 50*j* have the square configuration, while the seventh registration mark 50*g* and the eight registration mark 50*h* have the rectangular configuration. Contrasting from the fourth registration mark 50*d* and the fifth registration mark 50*e* that are part of the first registration mark group and are oriented vertically, the seventh registration mark 50*g* and the eighth registration mark 50*h* are oriented horizontally.

Furthermore, within the margin 32 and disposed along the top side 52*a* is the tenth registration mark 50*j*, an eleventh registration mark 50*k*, and a twelfth registration mark 50*l*. As mentioned previously, the feed direction arrow 34 is also disposed along the top side 52*a*, shown here positioned between the eleventh registration mark 50*k* and the twelfth registration mark 50*l*. Together, the tenth registration mark 50*j*, the feed direction arrow 34, the eleventh registration mark 50*k*, and the twelfth registration mark 50*l* define a third registration mark group 58.

The registration marks 50 in the first registration mark group 54, the second registration mark group 56, and the third registration mark group 58 are utilized for correcting the perspective errors that are introduced in the course of capturing an image with the camera 46. Thus, such registration marks 50 may be referred to as photograph registration marks, with the groupings thereof correspondingly referred to as photograph registration mark groups.

Figure 3B:
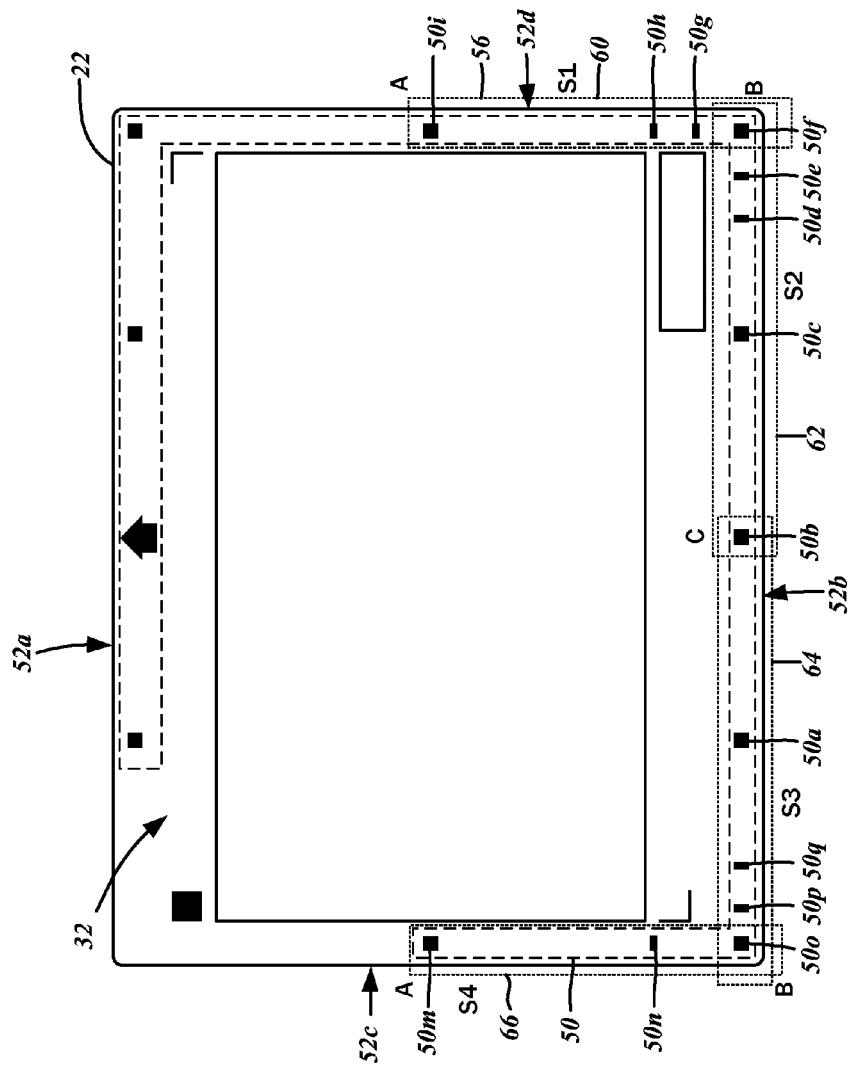

FIG. 3B illustrates a different set of groupings of the registration marks 50 that are utilized for correcting errors introduced during scanning. These groupings will be referred to as scanning registration mark groups, a first one 60 of which is comprised of the ninth registration mark 50*i*, the eighth registration mark 50*h*, the seventh registration mark 50*g*, and the sixth registration mark 50*f*. There is also a second scanning registration mark group 62 comprised of the sixth registration mark 50*f*, the fifth registration mark 50*e*, the third registration mark 50*c*, and the second registration mark 50*b*. A third scanning registration mark group 64 includes the second registration mark 50*b*, the first registration mark 50*a*, as well as a seventeenth registration mark 50*q* in the rectangular configuration, a sixteenth registration mark 50*p* also in the rectangular configuration, and a fifteenth registration mark 50*o* in the square configuration. A fourth scanning registration mark group 66 includes the fifteenth registration mark 50*o*, a fourteenth registration mark 50*n* in the rectangular configuration, and a thirteenth registration mark 50*m* in the square configuration.

The registration marks 50 in the first scanning registration mark group 60 and the second scanning registration mark group 62 are utilized when a partial scan of the right side 52*d* of the cutting mat 22 is being processed, while the registration marks 50 in the third scanning registration mark group 64 and the fourth scanning registration mark group 66 are utilized when a partial scan of the left side 52*c* of the cutting mat 22 is being processed.

The particular sets of registration marks 50 selected for the photograph mode, e.g., those in the first photograph registration mark group 54, the second photograph registration mark group 56, and the third photograph registration mark group 58, are intended to maximize the working area so that the accuracy of the "unperspectivize" operation can be maximized. On the other hand, the particular sets of registration marks 50 selected for the scanning mode, e.g., those in the first scanning registration mark group 60, the second scanning registration mark group 62, the third scanning registration mark group 64, and the fourth scanning registration mark group 66, are for enabling multi-part scanning of subsections of the cutting mat 22 to accommodate the smaller platen size of conventional scanners 42, while recognition of orientation (either portrait or landscape) is also possible.

Figure 4:
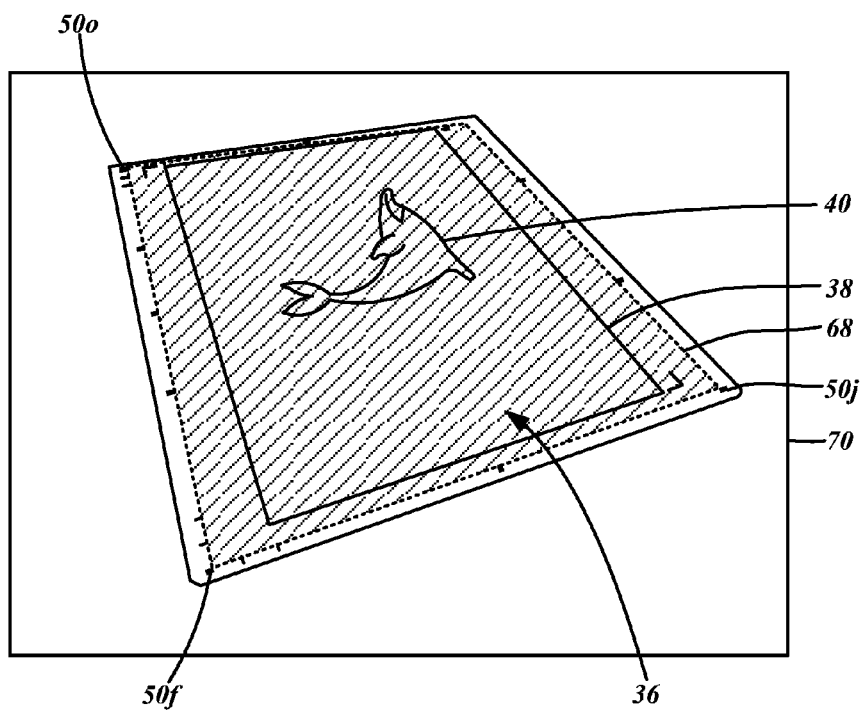
FIG. 4 is an example source image captured of a graphic on the cutting mat with perspective distortion.

FIG. 4 depicts an example source image 70 captured of the cutting mat 22 with the graphic 40 placed thereon. As shown, due to the angle at which the source image 70 was captured, there is substantial perspective error. Additionally, the source image 70 also exhibits rotation error. The edges of the cutting mat 22 are not parallel/perpendicular to each other, and the graphic 40 is distorted from the proper representation shown in FIG. 1. The methods of the present disclosure involve steps to correct the acquired image, and in particular, to the graphical content within an active area 68 that is expanded beyond the border 38 of the rectangular cutting field 36 bounded by the corners of the tenth registration mark 50$j$, the sixth registration mark 50$f$, and the fifteenth registration mark 50$o$.

Another embodiment of the disclosure is directed to a specific method for making these corrections, and can be utilized in the aforementioned method for producing cutting patterns. Referring to the flowchart of FIG. 5, this method similarly begins with a step 2000 of receiving the source image 70 as a bitmap. Again, the source image 70 is understood to have distortions that were introduced by the imaging device during acquisition. This step generally correlates to the step 1000 discussed above.

Referring back to the flowchart of FIG. 2, the method for producing cutting patterns continues with a step 1002 of identifying these registration marks 50 from the source image 70, and in particular, finding the (x,y) coordinates of each corners of the quadrilateral of the active area 68. Generally, this step involves matching candidate sets of a plurality of center points of regions of adjacent groupings of pixels within the source image 70 against predetermined positional relationships thereof that correspond to an actual arrangement of the registration marks 50 on the cutting mat 22.

Figure 5:
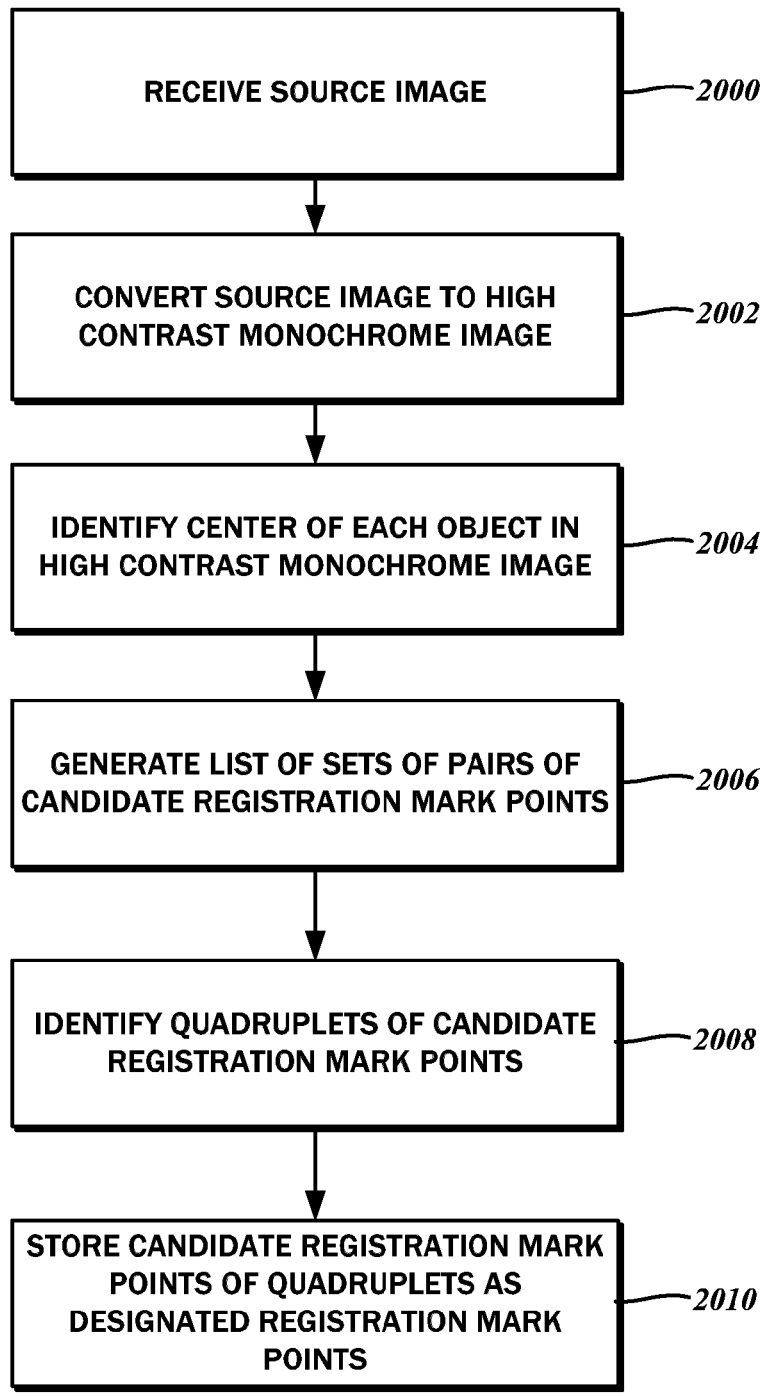
FIG. 5 is a flowchart of an embodiment of a method for correcting a source image of a graphic overlaid on a cutting mat in accordance with the present disclosure.
Figure 6:
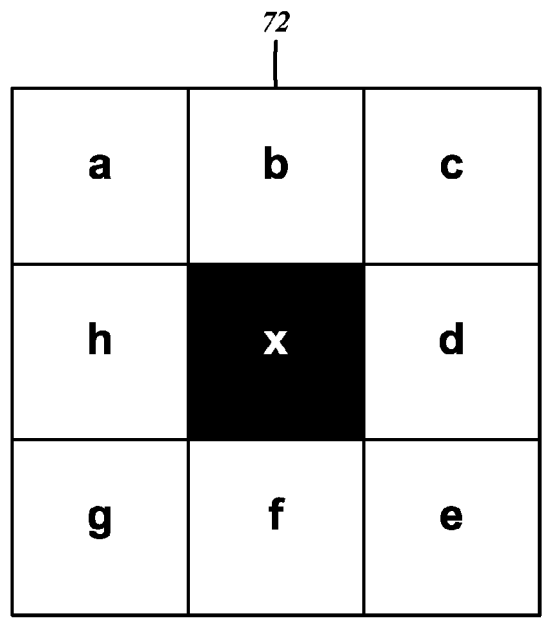
FIG. 6 is an example representation of a bitmap with a center pixel of interest surrounded by neighboring pixels.

This step may correspond to multiple separate steps in the exemplary embodiment of the method for making corrections as described in the flowchart of FIG. 5. In particular, there may be a step 2002 of converting the source image 70 to a high contrast monochrome image. When the source image 70 is acquired via either the camera 46 or the scanner 42, it is understood to be in full color or grayscale with each pixel being defined as a numerical value representative of a particular color along a color spectrum. Such a color image is converted to black and white by applying a high pass filter to the source image 70, which is understood to remove or at least reduce the effects of gradual elements therein such as shadows, while retaining the effects of sharp elements, in particular, the registration marks 50. The high pass filter is understood to mitigate the loss of fidelity in darker parts of the source image that would otherwise result from utilizing simple threshold filters, as well as enhance the edges between the objects and a background field.

Each pixel in the resultant image is represented by a single bit, and is either black or white, that is, not grayscale with corresponding shades between pure black and pure white. Ideally, the registration mark 50 will correspond to black pixels, while the area immediately surrounding it will correspond to white pixels. In general, the monochrome image will have a plurality of objects defined by regions of adjacent groupings of pixels on the background field.

The step 1002 of identifying the registration marks 50 in the method for producing cutting patterns may also correspond to a step 2004 in the method for making corrections of identifying a center of each of the objects in the high contrast monochrome image as a candidate registration mark point. This is achieved by reducing each object or mark down to a single pixel that is representative thereof via an erosion operation, which involves iteratively determining, for every black pixel in the image, whether or not it is a corner pixel as defined by certain criteria. If the particular black pixel being analyzed is deemed a corner pixel, then it is converted to a white pixel. On the other hand, if that pixel surrounded in all eight directions by white pixels (top, top left, left, bottom left, bottom, bottom right, right, top right) then it is designated as a candidate registration mark point, which may also be referred to as a hotspot.

According to one embodiment of the present disclosure, the criteria for what is or is not a corner can be selected so that the regions of adjacent/connected groupings of pixels can erode at an even rate on all sides. Thus, most objects are envisioned to erode towards a point close to or at the actual center thereof. The source image 70 is understood to be represented as a series of rows and columns of pixels with a pixel intensity value being assigned thereto. In the case of the monochrome image, each pixel may have either a black or white value assigned. FIG. 7 illustrates one representation of a fundamental bitmap field 72, with a central pixel 72$x$ being surrounded by eight neighboring pixels 72$a$-72$h$ in different directions. The erosion operation is limited to an application to the pixel 72$x$ that is surrounded thus, and any edge pixels of the bitmap that do not have these surrounding pixels 72$a$-72$h$ are skipped.

Figure 7A:
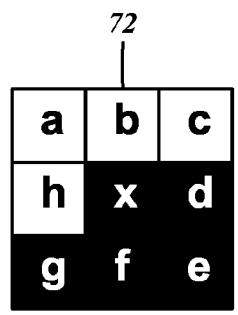
FIG. 7A-7C are example representations of the bitmap with the center pixel characterized as single connected, double connected, and triple connected, respectively.
Figure 7B:
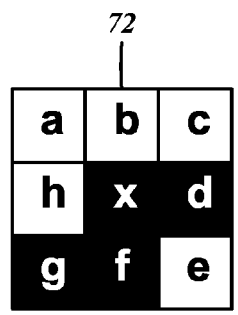
Figure 7C:
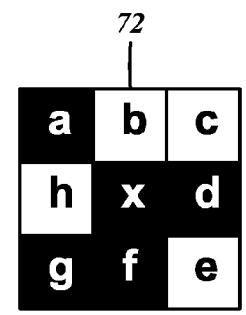

The determination of what is or is not a corner pixel is based upon a characterization thereof as being a single connected pixel, a double connected pixel, or a triple connected pixel. A single connected pixel may be defined as a single black pixel that has at least one neighbor pixel that is also black, and for which all of the neighbors of black pixels form a contiguous group. A double or triple connected pixel may be defined as a black pixel that has at least two or three, respectively, neighboring pixels that are also black, and for which the neighbors form a two or three groups. The example bitmap field of FIG. 7A illustrates a single connected pixel 72$x$, as together with neighboring pixel 72$d$, 72$e$, 72$f$, and 72$g$, a single contiguous group is defined. Furthermore, the example bitmap field of FIG. 7B illustrates a double connected pixel 72$x$. There is a first group with the pixel 72$x$ and the neighboring pixel 72$d$, as well as a second group with the pixel 72$x$ and the neighboring pixels 72$f$ and 72$g$, that is separated by a white neighboring pixel 72$e$. Finally, the example bitmap field of FIG. 7C illustrates a triple connected pixel 72$x$, defining three separate groups: a first group of the pixel 72$x$ and the neighboring pixel 72$d$, a second group of the pixel 72$x$ and the neighboring pixel 72$a$, and a third group of pixel 72$x$ and the neighboring pixels 72$f$ and 72$g$.

Several criteria are applied to characterize a given pixel 72 as a corner pixel or not. One criterion is that all corner pixels have a black value. Furthermore, at least one of the neighboring pixels 72$a$-$h$ also has a black value. Thus, solitary black pixels are not deemed corner pixels, and no further erosion operations will be applied thereto. An additional criterion is that the pixel being analyzed has at least four neighboring pixels 72*a-h* that have a white value. Finally, only a single connected pixel can be a corner pixel that is eligible for erosion. As a consequence, double or triple connected pixels are not eroded. It is possible for a pixel to be deemed a non-corner one during one iteration of erosion operation, but later becomes a corner pixel in a subsequent iteration when one or more of its neighboring pixels 72*a-h* have been eroded. Because several pixels can be eroded in a single iteration, the corner or non-corner status of any pixel may change during the iteration because of the erosion operation being applied to neighboring pixels. Each erosion operation is applied to a single pixel, so if after one pixel is eroded and it is determined that the next pixel that is being evaluated for the application of the erosion operation is no longer a corner pixel as a result, that pixel will not be eroded during that iteration. Each of the remaining solitary black pixels after the erosion operation is completed is deemed to be a hotspot or candidate registration mark point.

Figure 8:
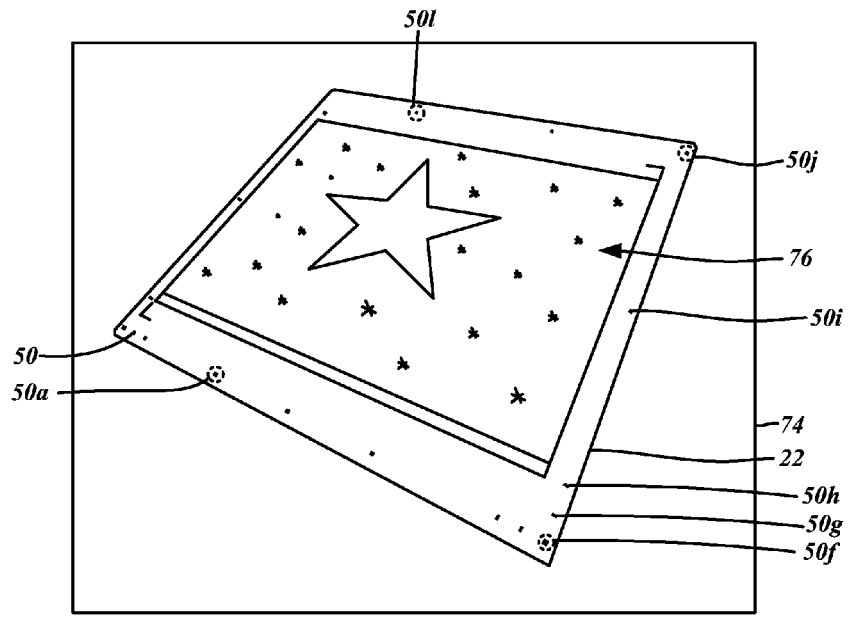
FIG. 8 is another example source image captured of the graphic on the cutting mat with perspective distortion.
Figure 9:
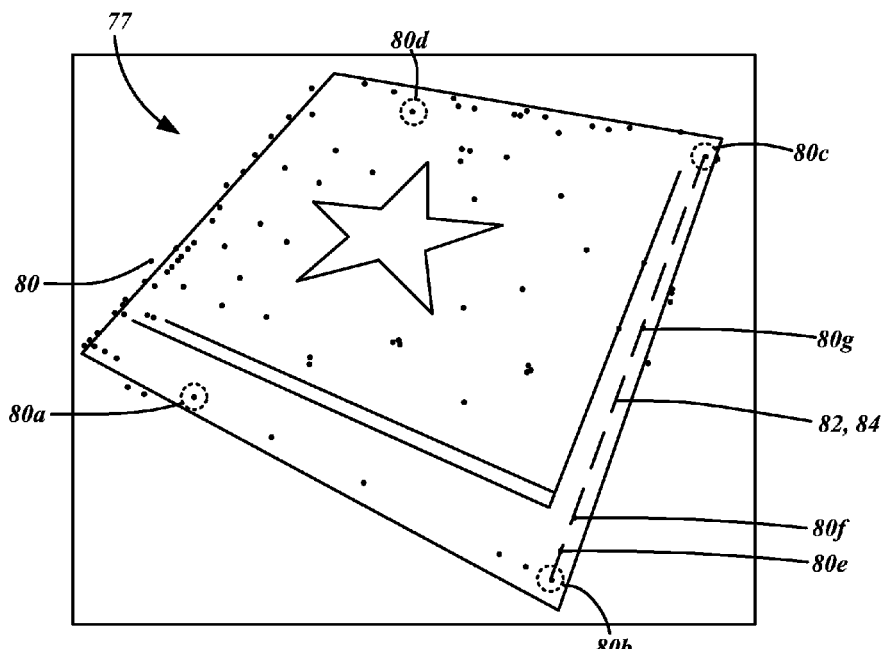
FIG. 9 is a bitmap resulting from an application of a high pass filter and an erosion procedure to the example source image of FIG. 8 showing candidate registration mark points.

FIG. 8 is another exemplary source image 74 of the cutting mat 22 with a graphic 76 overlaid thereon. Again, the cutting mat 22 includes at least the first registration mark 50*a*, the sixth registration mark 50*f*, the tenth registration mark 50*j*, and the twelfth registration mark 50*l*. After converting the source image 74 to the high-contrast monochrome image and applying the erosion operation thereto, a point map 77 of candidate registration mark points 80 as shown in FIG. 9 results. Almost all images are understood to contain dark regions in addition to the actual registration marks 50, and so there will be corresponding regions of black pixels that are generated as outputs of the high pass filter, along with false candidate registration mark points 80 or hotspots. In accordance with various embodiments of the present disclosure, a walking/line scanning procedure is executed to identify candidate registration mark points 80*a-d* that correspond to the actual registration marks 50*a*, 50*f*, 50*j*, and 50*l*, respectively, and filter out false candidate registration mark points 80 that are generated incidentally. Before this procedure, the coordinates of the actual registration marks 50 on the cutting mat 22 are not known.

The following example, which begins with the premise that the candidate registration mark point 80*b* corresponds to the actual registration mark 50*f* and that the candidate registration mark point 80*c* corresponds to the actual registration mark 50*j*, illustrates how candidate registration mark points 80 that do not correspond to an actual registration mark 50 could be filtered out. An imaginary line 82 is extended between the two candidate registration mark points 80*b*, 80*c*. As each pixel in that imaginary line 82 is evaluated, the number of intervening candidate registration mark points that fall on the imaginary line 82 can be counted. In the example, there is a fifth candidate registration mark point 80*e* that corresponds to the actual registration mark 50*g*, a sixth candidate registration mark point 80*f* that corresponds to the actual registration mark 50*h*, and a seventh candidate registration mark point 80*g* that corresponds to the actual registration mark 50*i*. Although these relationships are also not known, it is understood to fit an expected profile for a group of candidate registration mark points 80 that corresponds to a group of actual registration marks 50.

Figure 10:
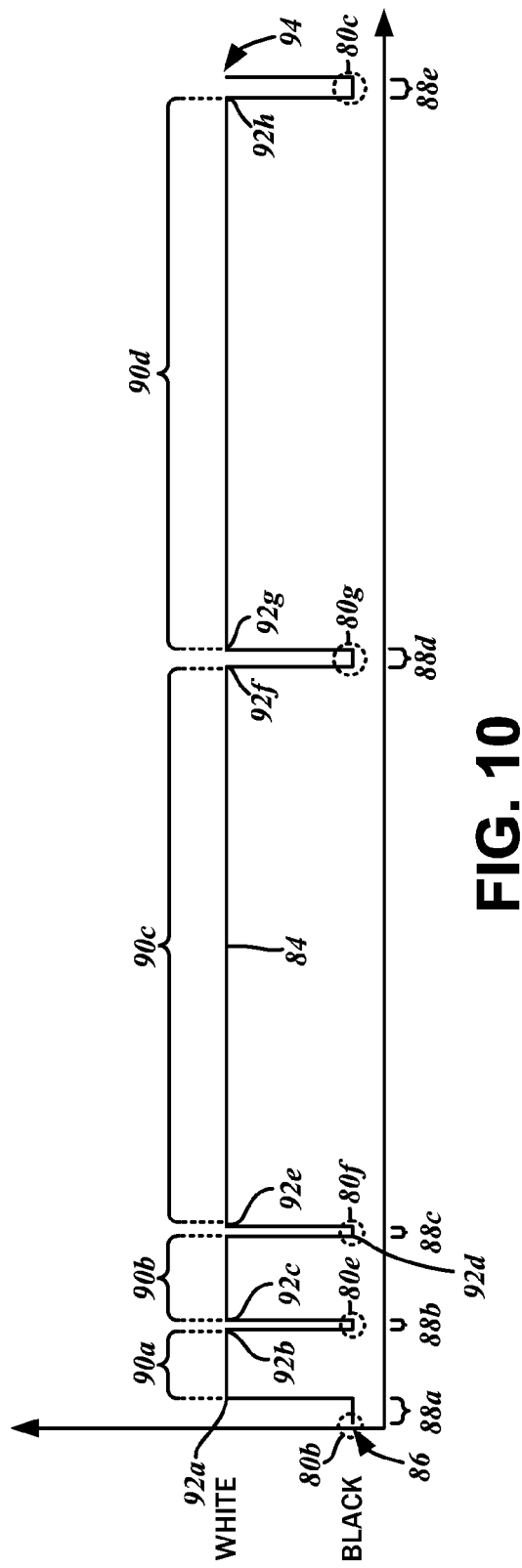
FIG. 10 is a graph of an exemplary scan line between a pair of candidate registration mark points.

The graph of FIG. 10 visually illustrates this process, which shows a plot of a scan line 84. The start 86 corresponds to the second candidate registration mark point 80*b*, and is thus indicated as black and identified as a first black region 88*a*. Then, the scan line 84 transitions to a first white region 90*a* at a switch point 92*a*, then transitions back to a second black region 88*b* at a switch point 92*b*. The first white region is understood to be the white space between the second candidate registration mark 80*b* and the fifth candidate registration mark point 80*e* shown in FIG. 9. Furthermore, the first black region 88*a* is understood be the second candidate registration mark point 80*b*, and the second black region 88*b* is understood to be the fifth candidate registration mark point 80*e*. Thereafter, the scan line 84 transitions to a second white region 90*b* at a switch point 92*c* until switch point 92*d*. This is understood to correspond to the white space between the fifth candidate registration mark point 80*e* and the sixth candidate registration mark point 80*f*, while the seventh candidate registration mark point 80*g* is indicated by a third black region 88*c* between the switch point 92*d* and a switch point 92*e*. After the switch point 92*e*, there is an extended third white region 90*c* that corresponds to the space between the sixth candidate registration mark point 80*f* and the seventh candidate registration mark point 80*g*. When the scan line 84 reaches the seventh candidate registration mark point 80*g*, there is another switch point 92*f* that starts the fourth black region 88*d*, which ends after a switch point 92*g*. The scan line 84 then encounters a switch point 92*h* after traversing the fourth white region 90*d* that is defined between the seventh candidate registration mark point 80*g* and the third candidate registration mark point 80*c*. A fifth black region 88*e* is understood to correspond to the third candidate registration mark point 80*c*, where the scan line 84 stops at an end 94.

As will be apparent from the context of the description above, the scan lines 84 can be generated from the point map 77. The total number of black regions 88 encountered in the scan line 84 is given by two less than total number of switch points (to account for the start 86 and the end 94) divided by two. In this way, the number of other candidate registration mark points 80 between a pair of spaced candidate registration mark points 80 can be determined.

Returning to the flowchart of FIG. 5, the method for making corrections to the source image continues with a step 2006 of generating a list of sets of pairs of the candidate registration mark points between which there are a predefined number of additional interposed candidate registration mark points 80. In further detail, all possible pairs of candidate registration mark points 80 are located, and for each pair, the number "N" of other candidate registration mark points spatially between the particular pair is determined. According to one embodiment, this may be achieved with the aforementioned scan line graph procedure that walks along imaginary lines between the particular hotspots or candidate registration mark points 80 of the particular pair. Those pairs of hotspots that do not conform to an expected value are excluded.

FIGS. 11A-11J illustrate a simplified example of an arrangement of the possible candidate registration mark points 80 and the pairs thereof that could be defined therewith. There is a first candidate registration mark point 80*a*, a second candidate registration mark point 80*b* that is positioned immediately to the right of the first candidate registration mark point 80*a*, a third candidate registration mark point 80*c* that is positioned immediately to the right of the second candidate registration mark point 80*b*, a fourth candidate registration mark point 80*d* that is immediately below the second candidate registration mark point 80*b*, and finally, a fifth candidate registration mark point 80*e* that is positioned immediately to the right of the third candidate registration mark point 80*c*. For these five hotspots or candidate registration mark points 80

Figures 11A, 11B, 11C, 11D, 11E, 11F, 11G, 11H, 11I, 11J:
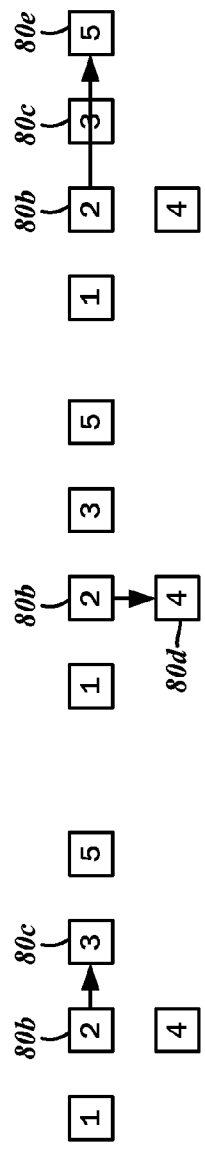
FIG. 11A-11J show examples of an arrangement of the possible candidate registration mark points and the pairs thereof.

FIG. 11A illustrates a pair of the first candidate registration mark point 80*a* and the second candidate registration mark point 80*b*. As shown, there are no other candidate registration mark points 80 that are spatially interposed between this pair, so the value N is understood to be zero. In other words, N=0 for the hotspot pair 1, 2.

FIG. 11B depicts a pair of the first candidate registration mark point 80a and the third candidate registration mark point 80c. Between this pair there is the second candidate registration mark point 80b, so the value N is one. That is, N=1 for the hotspot pair 1, 3.

FIG. 11C depicts a pair of the first candidate registration mark point 80a and the fourth candidate registration mark point 80d. There are no other candidate registration mark points 80 between this pair, so the value N is zero. Thus, N=0 for hotspot pair 1, 4.

FIG. 11D depicts a pair of the first candidate registration mark point 80a and the fifth candidate registration mark point 80e. The second candidate registration mark point 80b and the third candidate registration mark point 80c are spatially interposed between this pair, so the value N is two. Thus, N=2 for hotspot pair 1, 5.

FIG. 11E depicts a pair of the second candidate registration mark point 80b and the third candidate registration mark point 80c. As there are no other candidate registration mark points 80 between this pair, the value N is zero. Thus, N=0 for hotspot pair 2, 3.

FIG. 11F depicts a pair of the second candidate registration mark point 80b and the fourth candidate registration mark point 80d. There are no other candidate registration mark points 80 between this pair, so the value N is zero. Thus, N=0 for hotspot pair 2, 4.

FIG. 11G depicts a pair of the second candidate registration mark point 80b and the fifth candidate registration mark point 80e. The third candidate registration mark point 80c is positioned between this pair, so the value N is one. Thus, N=1 for hotspot pair 2, 5.

FIG. 11H depicts a pair of the third candidate registration mark point 80c and the fourth candidate registration mark point 80d. There are no other candidate registration mark points 80 between this pair, so the value N is zero. Thus, N=0 for hotspot pair 3, 4.

FIG. 11I depicts a pair of the third candidate registration mark point 80c and the fifth candidate registration mark point 80e, between which there are no other candidate registration mark points. Thus, the value N is zero for hotspot pair 3, 5.

FIG. 11J depicts a pair of the fourth candidate registration mark point 80d and the fifth candidate registration mark point 80e. There are no other candidate registration mark points 80 between this pair, so the value N is zero for hotspot pair 4, 5.

For a pair of hotspots A and B, i.e., the candidate registration mark points, a function N(A,B) is contemplated to be the value of N, or the number of distinct black regions computed in the scan line 84 between hotspots A and B. These steps are performed with respect to the entirety of the source image, and preferably though optionally, the monochrome eroded version thereof.

Now referring back to the flowchart of FIG. 5, the method for making corrections to the source image continues with a step 2008 of identifying a grouping of candidate registration mark points 80 from sets of the pairs in the aforementioned list that share at least one common candidate registration mark point 80. It is understood that when three pairs of hotspots or candidate registration mark points 80 share endpoints, they can be chained together to form a quadruplet, or four hotspots. All quadruplets for which one or more of the constituent pairs do not conform to the required values of N (the number of additional hotspots/candidate registration mark points 80 interposed between the pair) are eliminated. The quadruplets may be more generally referenced as chained groupings.

As best shown in FIG. 3A, the particular quadruplet of candidate registration mark points 80 to be identified are those of the first photograph registration mark group 54, the second photograph registration mark group 56, and the third photograph registration mark group 58. The first photograph registration mark group 54 may also be referred to as an axis P1, and is understood to be defined as a pair comprised of the first registration mark 50a and the sixth registration mark 50f. Because there are four other registration marks disposed between the first registration mark 50a and the sixth registration mark 50f, that is, the second registration mark 50b, the third registration mark 50c, and fourth registration mark 50d, and the fifth registration mark 50e, the value of N is set at 4. Thus, only those pairs having an N value of 4 are understood to be potential candidates for the axis P1. Along these lines, the second photograph registration mark group 56, referred to as an axis P2, may be defined as a pair comprised of the sixth registration mark 50f and the tenth registration mark 50j, with the value of N being 3, for the seventh registration mark 50g, the eight registration mark 50h, and the ninth registration mark 50i. Further, the third photograph registration mark group 58, referred to as an axis P3, may be defined as a pair comprised of the tenth registration mark 50j and the twelfth registration mark 50l, with the value of N being 2 for the eleventh registration mark 50k and the feed direction arrow 34.

The method is contemplated to search for chained groupings that meet the above-described conditions. That is, the quadruplets A, B, C, D that correctly represent the first registration mark 50a, the sixth registration mark 50f, the tenth registration mark 50j, and the twelfth registration mark 50l, respectively, and meet the condition of the pair A, B having an N value of 4 and therefore being a candidate for axis P1, the pair B, C having an N value of 3 and therefore being a candidate for axis P2, and the pair C, D having an N value of 2 and therefore being a candidate for axis P3. In one implementation, a brute force search technique using four nested loops may be utilized. However, due to the computational inefficiencies associated therewith, an alternative implementation may incorporate further optimizations that involve iteratively constraining the conditions that would qualify a quadruplet.

In an initial step, a list of all pairs of hotspots or candidate registration mark points 80 for the axis P1 is constructed. More particularly, all pairs for which N(A, B) is 4 would be part of such a list. Then, the list of the pairs A, B is narrowed to that which another pair B, C is characteristic of the axis P2, meaning that N(B, C) is 3. Every pair including C that meets this condition is then added to a list of triplets. Then, the list of triplets A,B,C is further narrowed to that which yet another pair C, D is characteristic of the axis P3, meaning that N(C, D) is 2. For every D that is found, the entire set of candidate registration marks A, B, C, D is added to the list of quadruplets, each of which is understood to be a candidate for the four corner hotspots that define the end axes P1, P2, and P3. The remaining pairs that have been so identified as being part of the quadruplets have satisfied increasingly stringent constraints that require particular patterns of black and white regions between candidate registration mark points 80, so the likelihood of identifying false quadruplets is minimized. It is understood, however, that the potential therefor remains, and further measures to reduce the possibility of false identifications are contemplated and will be described in detail below.

With reference again to the flowchart of FIG. 5, the method for making corrections to the source image continues with a step 2010 of storing the identified candidate registration mark points 80 that have been determined to be one of the proper quadruplets representing the registration marks 50 as designated registration mark points. This step in the method for making corrections to the source image may have an equivalent step 1004 in the method for producing cutting patterns that involves deriving values for an inverse transformation of the source image 74. In the photograph mode, the inverse transformation is the "unperspectivize" operation briefly mentioned above. The position data of the quadruplets A, B, C, and D are utilized to compute the necessary transformation to map pixels from the distorted source image 74 into a flat orthographic image, also referred to as a corrected image.

Figure 12A:
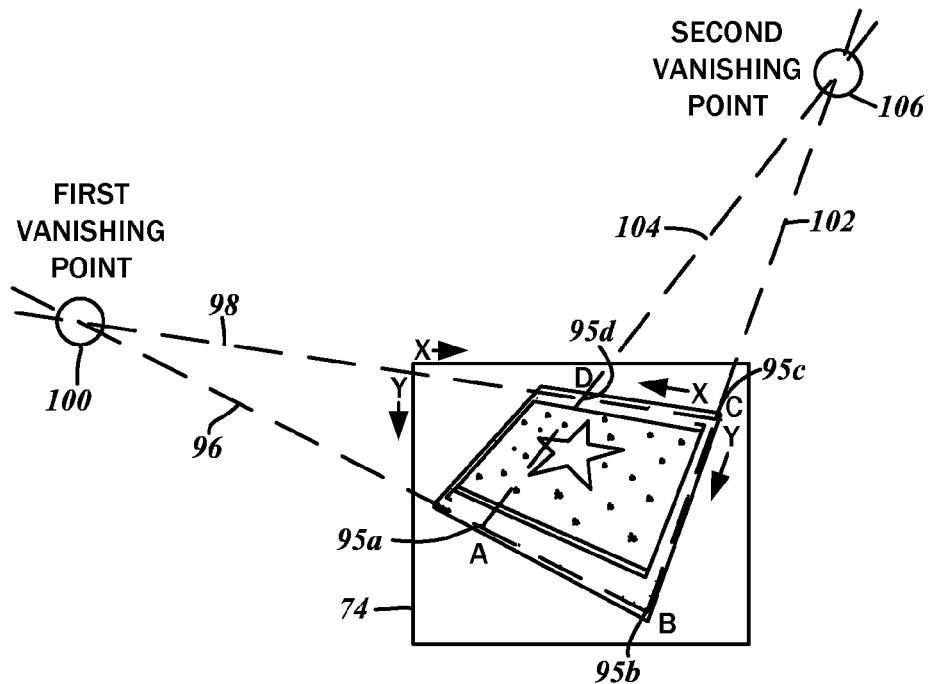
FIGS. 12A-12B are depictions of the source image with various lines extending through designated registration mark points overlaid thereon to illustrate procedures for correcting for perspective error.

As illustrated in FIG. 12A, two vanishing points are derived from the position data of the hotspots A, B, C, and D of the quadruplet. A first infinite straight line 96 intersecting A (a first designated registration mark point 95a) and B (a second designated registration mark point 95b) is generated. Furthermore, a second infinite straight line 98 intersecting C (a third designated registration mark point 95c) and D (a fourth designated registration mark point 95d) is generated. A first vanishing point 100 is defined as the intersection of the first infinite straight line 96 and the second infinite straight line 98. Furthermore, a third infinite straight line 102 intersecting B and C is generated, as is a fourth infinite straight line 104 intersecting A and D, the intersection of these two lines 102, 104 defining a second vanishing point 106. The various infinite straight lines 96, 98, 102, and 104 are understood to provide an association between the physical coordinates of the cutting mat 22 to the pixel coordinates of the source image 70. The third infinite straight line 102 is understood to correspond to the physical coordinate value of the X axis being 0.0 mm, while the second infinite straight line 98 is understood to correspond to the physical coordinate value of the Y axis being 0.0 mm. Furthermore, because the physical dimensions of the cutting mat 22 are known, the fourth infinite straight line 104 is understood to correspond to the physical coordinate value of the X axis being 275.00 mm, and the first infinite straight line 96 is understood to correspond to the physical coordinate value of the Y axis being 275.00 mm. It will be appreciated by those having ordinary skill in the art that these values are presented by way of example only and not of limitation. As utilized herein, the term "infinite" is not understood to refer to the underlying data representing the line continuing to infinity, but rather, it is intended to refer to the visually infinite line in the context of a vanishing point. Such lines could also be referred to simply as vertical and horizontal axis lines.

Figure 12B:
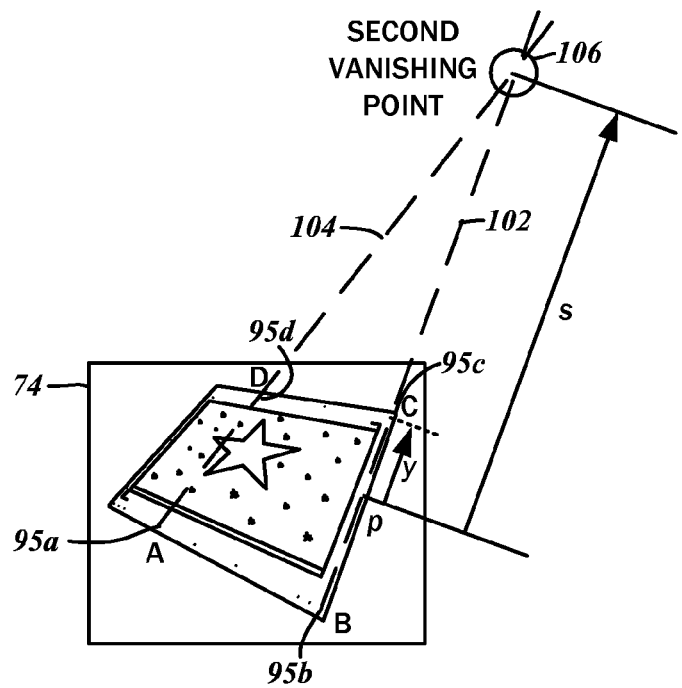

When the source image 70 has perspective distortion as here, a simple extrapolation from the aforementioned infinite lines is understood to be insufficient, as the closer the physical distance to the viewpoint, the greater the distance represented by each image pixel. In other words, the relationship between the distance in pixels from a vanishing point in the image and the distance in millimeters from a constant point of origin is one of division. Referring to the FIG. 12B, selecting any point P on the third infinite straight line 102, there is a distance s (in pixels) to the second vanishing point 106, and there is also a distance y (in mm) to the third designated registration mark point 95c. The distance s and the distance y are related, in that s=1/(a+by), and a and b are understood to be constant at all points along the third infinite straight line 102. The constants a and b are related to the known points B and C, that is, the second designated registration mark point 95b and the third designated registration mark point 95c.

The coordinates of the hotspot B, e.g., the second designated registration mark point 95b, was previously identified, with its coordinates determined. The corresponding value for the distance s, that is, the distance in pixels from the second designated registration mark point 95b to the second vanishing point 106 may be assigned as S1. Furthermore, continuing with the previous example of the known dimensions of the cutting mat 22 and the physical locations of the registration marks 50, at the second designated registration mark point 95b, the (x, y) coordinates of the physical location thereof is known to be (0.0, 275.0)—the y value is thus 275.0, and is assigned as Y1.

Likewise, the coordinates of the hotspot C, e.g., the third designated registration mark point 95c, was previously identified. This known value can also be used to deduce the distance in pixels from the third designated registration mark point 95c to the second vanishing point 106, which is assigned to a variable S2. The physical location at the hotspot C is known, and the (x, y) coordinates are (0.0, 0.0). As such, the y value is 0.0, and is assigned to a variable Y2.

The aforementioned a and b constant values can be solved with the variables S1, S2, Y1, and Y2. In further detail, a is defined as:

$$\frac{\left(\frac{1.0}{S_1}\right) - \left(\frac{1.0}{S_2}\right)}{(Y_1 - Y_2)},$$

and b is defined as:

$$\left(\frac{1.0}{S_1}\right) - b*Y1.$$

With a and b determined, a known relationship between pixel coordinates along the third infinite straight line 102, that is, along the y axis, and the corresponding physical coordinates (in mm) on the cutting mat 22 has been established. This procedure may be repeated to find the two constants relating the pixel coordinates on the second infinite straight line 98 with the corresponding physical coordinates (in mm) on the cutting mat 22 along the x axis. Accordingly, for any physical x coordinate, the corresponding point on the source image 70 on the second infinite straight line 98 (between hotspots D, C) can be determined. A line extending from any point along the third infinite straight line 102 through the first vanishing point 100 is understood to correspond to a physical line on the cutting mat 22 that is parallel to the x axis thereof. Along these lines, for any physical y coordinate, the corresponding point on the source image 70 on the second infinite straight line 102 (between hotspots B, C) can be determined. A line extending from any point along the second infinite straight line 98 to the second vanishing point 106 is understood to correspond to a physical line on the cutting mat 22 that is parallel to the y axis thereof.

Having thus derived the values for the inverse transformation, the method for making corrections to the source image then continues with a step 1006 to apply that transformation. This transformation is understood to be based upon the designated registration mark points 95, and the corrected image is defined with reference to the physical coordinates of the cutting mat 22. This step is understood to have an equivalent step 1006 in the method for producing cutting patterns of applying the inverse transformation to the source image with the derived values therefor. As a result, a corrected image is generated as a bitmap that is aligned to the physical coordinates of the cutting mat 22, and is thus referenced to the cutting machine 20.

Figure 13:
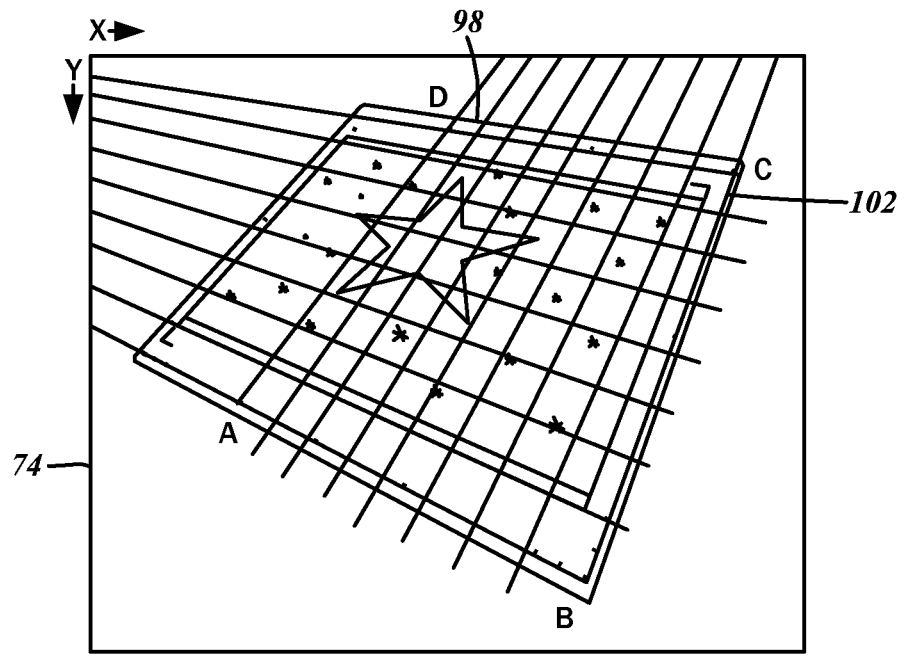
FIG. 13 is a depiction of the source image with a mesh overlaid thereon used to extrapolate physical coordinates of the cutting mat to pixel coordinates.

With reference to the example source image 74 shown in FIG. 13, the physical points P thereof defined as coordinates (px, py), are translated to the corresponding image coordinates (sx, sy). According to one implementation, this involves locating the image coordinate position on the third infinite straight line 102 (between hotspots B and C) that corresponds to py, and drawing a line to the first vanishing point 100. Then, the image coordinate position on the second infinite straight line 98 (between hotspots C and D) that correspond to px is located, and a line to the second vanishing point 106 is drawn. The intersection of these two lines gives the image coordinates (sx, sy) that correspond to the physical coordinates (px, py). This process is repeated for every (px, py) position on a fine grid, and essentially overlays a mesh of the horizontal and vertical axis lines drawn to the vanishing points 100, 106. The grid may have a constant spacing that may be variously configured, and in one embodiment, the spacing may be 0.1 mm per grid square.

As indicated above, it is possible for multiple quadruplets to be identified. The foregoing "unperspectivize" operation may also be used to determine whether the transformed quadruplet was, indeed, a true quadruplet that represents the correct registration marks 50. This may be based upon a computation of the relationships between image coordinates (in pixels) and the corresponding physical coordinates (in mm), that is, discarding false quadruplets or chained groupings based on error magnitudes of distances between the candidate registration mark points 80 thereof and actual predefined distances between corresponding registration marks 50 as physically positioned on the cutting mat 22.

Referring again to FIG. 8, 9 and FIG. 10, in an example quadruplet comprised of the first registration mark 50a, the sixth registration mark 50f, the tenth registration mark 50j, and the twelfth registration mark 50l, every transition between a white pixel and a black pixel, also referred to as a switch point, has a known position in terms of the image coordinates, as it was sampled during processing. Furthermore, the physical positions of the true switch points are also known, because those are predefined in the cutting mat 22. The physical coordinates of each of the switch points along the scan line 84 can be derived from the image coordinates of the candidate registration mark points 80 using the above-described "unperspectivize" operation. The error value may be the distance from the computed physical coordinates corresponding to the switch point as sampled compared to the expected location of that switch point. The error values can be computed for all switch points of the candidate registration mark points 80, and the average error can be derived. If the average is sufficiently small, there is a greater likelihood that the quadruplet being analyzed is a true one, but if the average is large, then it is more likely to be false. In such case, the quadruplet is discarded.

The implementation of the erosion procedure contemplated herein reduces a region of black pixels to a single pixel that is or near the center thereof. However, there may be some variability in this regard due to differing lighting conditions and the parameters for the high pass filter that generates the high contrast monochrome image. Moreover, the appearance of the registration mark 50 may be subject to perspective distortions. For these reasons, the position of the candidate registration mark points 80 may vary and may not correspond precisely to the true physical center of the registration mark 50 as positioned on the physical cutting mat 22.

Figure 14:
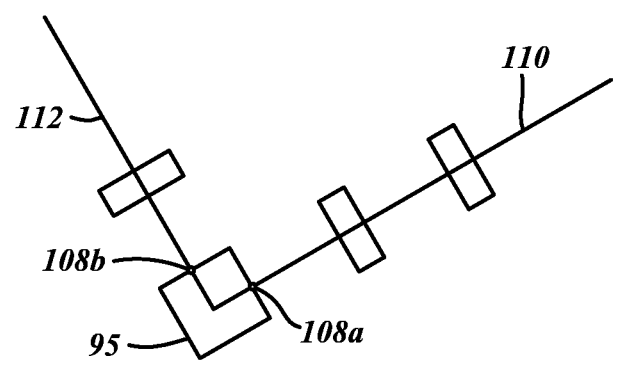
FIG. 14 is a detailed representation of the bitmap of the source image showing switch points along a scan of the registration marks.

The present disclosure contemplates further improvements to the accuracy in designating the center of the registration mark 50 that employs a similar process involving the switch points that represent transitions between a black pixel and a white pixel in a given scan line. Referring to the example shown in FIG. 14, the coordinates of a first switch point 108a along a scan line 110 extending in a first direction are determined. Then, the coordinates of a second switch point 108b along a different scan line 112 extending perpendicular to the scan line 110 in a second direction are determined.

Figure 15:
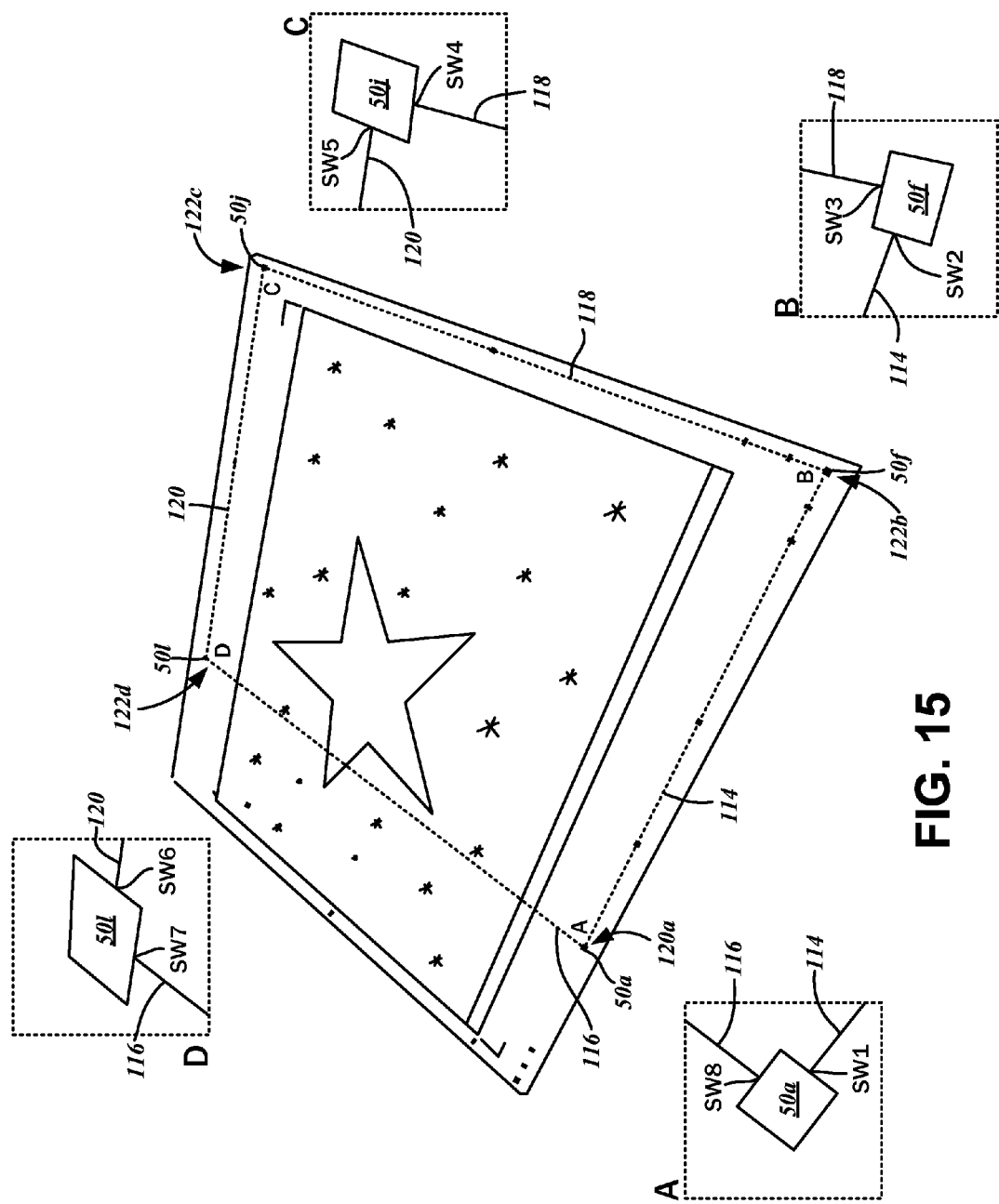
FIG. 15 is a depiction of the source image with inserts A-D showing the use of switch points to determine coordinates of corners to a greater degree of accuracy.

Referring to FIG. 15, the identification of the switch points in the foregoing manner is made for each of the identified hotspots A, B, C, and D, in the source image 74 that is, for the first registration mark 50a, the sixth registration mark 50f, the tenth registration mark 50j, and the twelfth registration mark 50l, respectively. As shown in the detailed insert A, the first registration mark 50a has a switch point SW1 coinciding with a line AB 114 that extends from the first registration mark 50a to the sixth registration mark 50f. Furthermore, the first registration mark 50a has a switch point SW8 coinciding with a line AD 116 that extends from the first registration mark 50a to the twelfth registration mark 50l. The detailed insert B, corresponding to the sixth registration mark 50f, has a switch point SW2 coinciding with the line AB 114, as well as a switch point SW3 coinciding with a line BC 118 that extends from the sixth registration mark 50f to the tenth registration mark 50j. The detailed insert C, which corresponds to the tenth registration mark 50j, has a switch point SW4 coinciding with the line BC 118, and a switch point SW5 that coincides with a line CD 120 extending between the tenth registration mark 50j and the twelfth registration mark 50l. The detailed insert shows the twelfth registration mark 50l, which has a switch point SW6 that coincides with the line CD 120, and a switch point SW7 that coincides with the line AD 116.

With the coordinates for the various switch points SW1-SW8, the particular coordinates of the identified hotspots A, B, C, and D that are used for the "unperspectivize" operations can be determined with greater accuracy. A first corner 122a is defined as an intersection of a line extending between switch points SW6 and SW1, and a line extending between the switch points SW8 and SW3. A second corner 122b is defined as an intersection of the line extending between the switch points SW8 and SW3, and a line extending between the switch points SW2 and SW5. A third corner 122c is defined as an intersection of the line extending between the switch points SW2 and SW5, and a line extending between the switch points SW4 and SW7. A fourth corner 122d is defined as an intersection of the line extending between the switch points SW4 and SW7, and a line extending between the switch points SW6 and SW1.

Having considered the various steps of the methods in the context of the photograph mode, those same steps will be described in the context of the scanning mode. In almost all respects, the same procedures are involved, except that in the scanning mode, the imported image is not understood to exhibit perspective, stretch, or shear error, so the aforementioned "unperspectivize" operations are not performed.

As described above with reference to FIG. 3B, the same registration marks 50 of the cutting mat 22 are utilized for deriving inverse transformations in accordance with step 1004, but the groupings may be different. In particular, there is the first scanning registration mark group 60, the second scanning registration mark group 62, a third scanning registration mark group 64, and a fourth scanning registration mark group 66.

When generating the list of sets of pairs in accordance with step 2006, the expected number of additional candidate registration mark points positioned between the particular pair is understood to conform to those of the scanning registration mark groups 60, 62, 64, and 66. In this regard, the first scanning registration mark group 60 defined by hotspots A, B and referred to as axis S1 is understood to have an N value of 2, for the seventh registration mark 50g and the eighth registration mark 50h. Furthermore, the second scanning registration mark group 62 defined by hotspots B, C, and referred to as axis S2 has an N value of 3, for the fifth registration mark 50e, the fourth registration mark 50d, and the third registration mark 50c. Similarly, the third scanning registration mark group 64 defined by hotspots C, B on the left hand side of the cutting mat 22 and referred to as axis S3 has an N value of 3 for the first registration mark 50a, the seventeenth registration mark 50q, and the sixteenth registration mark 50p. The fourth scanning registration mark group 66 defined by hotspots A, B on the left hand side of the cutting mat 22 and referred to as axis S4 has an N value of 1 for the fourteenth registration mark 50n.

The identification of the chained groupings of candidate registration mark points 80 is understood to seek triplets of hotspots A, B, and C (on either the right or the left side of the cutting mat 22). Because no perspective, stretch, or shear errors are expected when utilizing the scanner, to the extent any triplet exhibits any deviation from a generally perpendicular relationship, such a triplet can be rejected.

Again, although the "unperspectivize" procedure will not operate on scanned images, because it not possible to make a prediction as to what angle or position the cutting mat 22 will be scanned, in accordance with the various methods of the present disclosure, the scanning mode retains the step of transforming the source image to a corrected image, with the image coordinates being converted to corresponding physical coordinates that can be referenced to the cutting machine 20.

One implementation utilizes an inverse transformation matrix to make the corrections. The physical coordinates of the thirteenth registration mark 50m, the fifteenth registration mark 50o, and the second registration mark 50b, each of which are expressed in millimeters, are known from the configuration of the cutting mat 22, and assigned to variables Y, O, and X, respectively. Thereafter, a 3×3 matrix is constructed thus:

$$M = \begin{bmatrix} X.x - O.x & Y.x - O.x & O.x \\ X.y - O.y & Y.y - O.y & O.y \\ 0 & 0 & 1 \end{bmatrix}.$$

X.x is the x coordinate value of variable X, e.g., the second registration mark 50b, O.x is the x coordinate value of variable O, e.g., the fifteenth registration mark 50o, Y.x is the x coordinate value of variable Y, e.g., the thirteenth registration mark 50m, X.y is the y coordinate value of variable X, Y.y is the y coordinate value of variable Y, and O.y is the y coordinate value of variable O.

With the aforementioned erosion and scan line procedure, the pixel positions of the points in the image corresponding to the Y, O, and X locations can be found. These may be referred to as Y', O' and X', and another 3×3 matrix is constructed therefrom:

$$N = \begin{bmatrix} X'.x - O'.x & Y'.x - O'.x & O'.x \\ X'.y - O'.y & Y'.y - O'.y & O'.y \\ 0 & 0 & 1 \end{bmatrix}.$$

From this, matrix multiplication and inversion can be used to compute a compound matrix T, which will transform from pixel coordinate values in the image to physical coordinate values (specified in mm) of the cutting mat 22. Specifically, T=M*N⁻¹.

Some embodiments of the cutting mat 22 may be too large to fit on to the platen of the scanner 42, because the cutting area 38 is 297 mm by 216 mm, which, with the addition of outer periphery or margin 32, will not fit within an A4 sized or letter sized scanning area. Thus, it may be necessary to acquire a source image in two parts. Referring to FIG. 16A, in a first pass, a left side 124 of the cutting mat 22 is scanned as delineated by the scan area 126. Only a portion of a graphic 128 placed on the cutting mat 22 is captured (as partial graphic 128a). The portions of the cutting mat 22 including the thirteenth registration mark 50m, the fourteenth registration mark 50n, the fifteenth registration mark 50o, the sixteenth registration mark 50p, the seventeenth registration mark 50q, the first registration mark 50a, and the second registration mark 50b, among others that are not utilized for this particular operation, are also captured. As discussed above, these registration marks 50 constitute the axes S3 and S4.

After this step, as shown in FIG. 16B, the cutting mat 22 can be rotated 180 degrees and scanned with the same scan area 126 in a second pass in which a right side 130 is captured (as partial graphic 128b). The portions of the cutting mat 22 including the second registration mark 50b, the third registration mark 50c, the fourth registration mark 50d, the fifth registration mark 50e, the sixth registration mark 50f, the seventh registration mark 50g, the eighth registration mark 50h, and the ninth registration mark 50i, which constitute the axes S1 and S2.

Regardless of the order in which the left side 124 and the right side 130 of the cutting mat 22 is scanned first, and regardless of the orientation (portrait or landscape, and inversions thereof) of the scan area 126 for either side, automatic detection and transformation to the correct orientation and translation or position without any further user intervention are contemplated. Although only one size of the cutting mat 22 has been described in detail, those having ordinary skill in the art will recognize that it, along with the various registration marks 50 can be scaled down or up, and/or arranged with different overall number of registration marks and/or different configurations with regard to the positions of individual registration marks, according to the configuration of the cutting machine 20. The particular dimensional parameters for each variation of the cutting mat 22 are known, so the correction and transformation steps specific thereto can be also be selected automatically without user intervention. Along these lines, it is also possible to further detect that a photograph has been captured rather than scanned in accordance with the steps described above, and apply the appropriate transformations suitable for this context.

These context determinations are based on the aforementioned analysis of the chained grouping of candidate registration mark points. A triplet of hotspots (A, B, C) with the least average error is identified, as well as a quadruplet of hotspots (A, B, C, D) with the least average error. Then, based upon which of the triplet or the quadruplet of hotspots have the least average error, the context of whether the source image is a photograph with perspective error, a scanned image or a partially scanned image with rotation error, is determined, and the corresponding corrections are applied.

Returning to the feature of scanning the left side 124 and the right side 130 of the cutting mat 22, the transformation of the captured images to align with the physical coordinates of the cutting mat 22 are understood to be independently performed. Because of these transformations, any variations due to positioning and rotation are removed, and following a splicing operation, a single image 128 is constructed as shown in FIG. 17. As such, no further intervention from the user is understood to be necessary.

Referring again to the flowchart of FIG. 2, after the corrected image has been generated in accordance with one of the aforementioned modalities, the method continues with a step 1008 of deriving a cut path from generated vectors of the corrected image. The cut path is understood to be defined with reference to the physical coordinates as utilized by the cutting machine to position the cutting tool. A tracing function may be utilized to generate the vectors, and the various techniques therefor are known in the art. Thereafter, the cutting mat 22 is fed into the cutting machine 20, and the data representing the cut path is transmitted to the cutting machine in accordance with a step 1010. The operation of the cutting machine 20 may vary, though in one implementation, the positioning of the cutting tool is calibrated with the cutting machine register marks 30, which were briefly mentioned above. After executing the cut path, a cutting pattern is created.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method for producing a cutting pattern on a cutting mat with a graphic placed thereon for feeding to a cutting machine, the cutting pattern being based upon a cut path corresponding to an outline of the graphic, the method comprising:
   receiving a source image of the graphic overlaid on the cutting mat from an imaging device as a bitmap, the source image including a plurality of registration marks and one or more distortions introduced by the imaging device during acquisition;
   identifying the plurality of registration marks from the source image from a matching of candidate sets of a plurality of center points of regions of adjacent groupings of pixels within the source image against predetermined positional relationships thereof corresponding to an actual arrangement of the registration marks on the cutting mat;
   deriving values for an inverse transformation of the source image from the identified plurality of registration marks on the cutting mat;
   applying the inverse transformation to the source image with the derived values to generate a corrected image as a bitmap aligned to physical coordinates of the cutting mat referenced to the cutting machine;
   deriving the cut path from generated vectors of the corrected image, the cut path being defined with reference to the physical coordinates utilized by the cutting machine; and
   transmitting the cut path to the cutting machine for execution thereon.

2. The method of claim 1, wherein the imaging device is a camera, the one or more distortions introduced to the source image thereby including at least one of a perspective error and a rotation error.

3. The method of claim 2, wherein deriving values for the inverse transformation of the source image includes:
   deriving vanishing points of horizontal and vertical axis lines in the source image; and
   generating a mesh of the horizontal and axis lines.

4. The method of claim 3, further comprising:
   removing the perspective error based upon quantified characteristics of the mesh to generate the corrected image.

5. The method of claim 1, wherein the imaging device is a scanner, the one or more distortions introduced to the source image thereby including at least one of a rotation error and a translation error.

6. The method of claim 5, wherein deriving values for the inverse transformation of the source image includes calculating at least one of a rotation angle and a translation distance.

7. The method of claim 6, further comprising:
   removing the rotation error with an application of an inverse transformation matrix to the source image.

8. The method of claim 1, wherein identifying the plurality of registration marks includes converting the source image to a high contrast monochrome image by the application of a high pass filter.

9. The method of claim 1, wherein identifying the plurality of registration marks includes deriving the center points of regions of adjacent groupings of pixels within the source image by eroding each of the regions to a single pixel.

10. The method of claim 1, wherein identifying the plurality of registration marks includes iteratively generating the candidate sets of the plurality of center points.

11. The method of claim 1, wherein the cutting mat has a quadrilateral configuration with the registration marks being disposed on an outer periphery along a plurality of sides of the cutting mat.

12. The method of claim 11, wherein each of a set of registration marks is a photograph mark, a first subset thereof being disposed on the outer periphery of the cutting mat along a first one of the plurality of sides, a second subset thereof being disposed on the outer periphery of the cutting mat along a second one of the of plurality of sides, and a third subset thereof being disposed on the outer periphery of the cutting mat along a third one of the plurality of sides, the first and third ones of the plurality of sides being opposed to each other and perpendicular to the second one of the plurality of sides.

13. The method of claim 12, wherein the values for the inverse transformation of the source image are derived from a chain of the first subset, second subset, and third subset of the set of registration marks.

14. The method of claim 11, wherein each of a set of registration marks is a scan mark, a first subset thereof being disposed on the outer periphery of the cutting mat along a first one of the plurality of sides, a second subset thereof being disposed on the outer periphery of the cutting mat along a part of a second one of the plurality of sides, a third subset thereof being disposed on the outer periphery of the cutting mat along another part of the second one of the plurality of sides, and a fourth subset thereof being disposed on the outer periphery of the cutting mat along a third one of the plurality of sides.

15. The method of claim 14, wherein the values for the inverse transformation of the source image are derived from a chain of at least one of a first combination including a first subset and a second subset of the set of registration marks, and a second combination including a third subset and fourth subset of the set of registration marks.

16. A method for correcting a source image of a graphic overlaid on a cutting mat including a plurality of registration marks to generate a cut path corresponding to an outline of the graphic and from which a sheet cutting pattern is produced, the method comprising:
   receiving a source image from an imaging device as a bitmap, the source image including one or more distortions introduced by the imaging device during acquisition;
   converting the source image to a high contrast monochrome image with a plurality of objects defined by regions of adjacent groupings of pixels on a background field;
   identifying a center of each of the objects in the high contrast monochrome image as a candidate registration mark point;
   generating a list of sets of pairs of the candidate registration mark points with each pair having a predefined number of additional candidate registration mark points interposed between a straight line spanning the candidate registration mark points of a particular one of the pair sets;
   identifying a chained grouping of candidate registration mark points from sets of the pairs in the list sharing at least one common candidate registration mark point;
   storing each of the candidate registration mark points of the identified chained groupings as designated registration mark points corresponding to corner regions of the cutting mat as represented in the source image; and
   transforming the source image to a corrected image defined according to physical coordinates based upon the designated registration mark points.

17. The method of claim 16, wherein the imaging device is a camera, the one or more distortions introduced to the source image thereby including at least one of a perspective error and a rotation error.

18. The method of claim 17, wherein the step of transforming the source image to a corrected image corrects at least one of the perspective error and the rotation error, and is in response to a determination of the imaging device being the camera based upon an analysis of the source image.

19. The method of claim 16, wherein the imaging device is a scanner, the one or more distortions introduced to the source image thereby including at least one of a rotation error and a translation error.

20. The method of claim 19, wherein the step of transforming the source image to a corrected image corrects at least one of the rotation error and the translation error, and is in response to a determination of the imaging device being the scanner based upon an analysis of the source image.

21. The method of claim 16, wherein converting the source image to the high contrast monochrome image includes applying a high-pass filter to the source image to enhance edges between the background field and the plurality of objects.

22. The method of claim 16, wherein identifying the center of each of the objects in the high contrast monochrome image includes reducing each of the objects to a single pixel by erosion.

23. The method of claim 16, further comprising:
   discarding false chained groupings based on computed error magnitudes of distances between the candidate registration mark points thereof and actual predefined distances between corresponding registration marks on the cutting mat.

24. The method of claim 16, wherein the cutting mat is defined by one of a plurality of sets of predetermined dimensional parameters, the method further comprising:
   detecting a particular one of the plurality of sets of predetermined dimensional parameters from the source image.

25. The method of claim 16, further comprising:
   deriving a cut path from generated vectors of the corrected image, the cut path being defined with reference to the physical coordinates utilized by a cutting machine.

26. An article of manufacture comprising a non-transitory program storage medium readable by a data processing device, the medium tangibly embodying one or more programs of instructions executable by the device to perform a method for producing a cutting pattern on a cutting mat with a graphic placed thereon for feeding to a cutting machine, the cutting pattern being based upon a cut path corresponding to an outline of the graphic, the method comprising:
   receiving a source image of the graphic overlaid on the cutting mat from an imaging device as a bitmap, the source image including a plurality of registration marks and one or more distortions introduced by the imaging device during acquisition;
   identifying the plurality of registration marks from the source image from a matching of candidate sets of a plurality of center points of regions of adjacent groupings of pixels within the source image against predetermined positional relationships thereof corresponding to an actual arrangement of the registration marks on the cutting mat;
   deriving values for an inverse transformation of the source image from the identified plurality of registration marks on the cutting mat;
   applying the inverse transformation to the source image with the derived values to generate a corrected image as a bitmap aligned to physical coordinates of the cutting mat as tied to the cutting machine;
   deriving the cut path from generated vectors of the corrected image, the cut path being defined in alignment with the coordinate axes of the cutting machine; and
   transmitting the cut path to the cutting machine for execution thereon.

27. A method for producing a cutting pattern on a cutting mat with a graphic placed thereon for feeding to a cutting machine, the cutting pattern being based upon a cut path corresponding to an outline of the graphic, the method comprising:
   receiving a first partial source image of a first part of the graphic overlaid on the cutting mat from an imaging device as a bitmap, the first partial source image including a first set of registration marks and one or more distortions introduced by the imaging device during acquisition;
   receiving a second partial source image of a second part of the graphic overlaid on the cutting mat from the imaging device as a bitmap, the second partial source image including a second set of registration marks and one or more distortions introduced by the imaging device during acquisition;
   separately identifying the first set of registration marks from the first partial source image and the second set of registration marks from the second partial source image from matching of candidate sets of a plurality of center points of regions of adjacent groupings of pixels within the respective first partial source image and the second partial source image against predetermined positional relationships thereof corresponding to an actual arrangement of the registration marks on a respective first section and a second section of the cutting mat;

separately deriving values for an inverse transformation of the first partial source image and the second partial source image from the respective identified plurality of registration marks on the cutting mat;

separately applying the respective inverse transformations to the first partial source image and the second partial source image with the respective derived values to generate a corrected first partial image and a corrected second partial image as bitmaps conforming to physical coordinates of the cutting mat as tied to the cutting machine;

combining the corrected first partial image and the corrected second partial image into a corrected complete image;

deriving the cut path from generated vectors of the corrected complete image, the cut path being defined relative to the coordinate axes of the cutting machine; and transmitting the cut path to the cutting machine for execution thereon.

28. The method of claim 27, wherein the imaging device is a scanner, the one or more distortions introduced to the first partial source image and the second partial source image thereby including at least one of a rotation error and a translation error.

29. The method of claim 28, wherein deriving values for the inverse transformations of the first partial source image and the second partial source image includes calculating at least one of a rotation angle and a translation distance.

30. The method of claim 29, further comprising:

removing the rotation errors with an application of an inverse transformation matrix to the respective first partial source image and the second partial source image.

* * * * *